(12) United States Patent
Kimura et al.

(10) Patent No.: US 7,046,422 B2
(45) Date of Patent: May 16, 2006

(54) REFLECTION-TYPE LIGHT MODULATING ARRAY ELEMENT AND EXPOSURE APPARATUS

(75) Inventors: Koichi Kimura, Kanagawa (JP); Katsuto Sumi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/965,043

(22) Filed: Oct. 15, 2004

(65) Prior Publication Data

US 2005/0099670 A1 May 12, 2005

(30) Foreign Application Priority Data

Oct. 16, 2003 (JP) ............... P.2003-356709

(51) Int. Cl.
*G02B 26/00* (2006.01)

(52) U.S. Cl. ............... 359/295; 359/292; 359/291; 359/224; 359/318; 359/298

(58) Field of Classification Search ............... 359/223, 359/224, 290–292, 295, 298, 318
See application file for complete search history.

(56) References Cited

U.S. PATENT DOCUMENTS

| | | | | |
|---|---|---|---|---|
| 4,566,935 A * | 1/1986 | Hornbeck | | 359/291 |
| 5,579,149 A * | 11/1996 | Moret et al. | | 359/223 |
| 6,107,115 A * | 8/2000 | Atobe et al. | | 359/292 |
| 6,538,800 B1 * | 3/2003 | Huibers | | 359/291 |
| 6,600,591 B1 * | 7/2003 | Anderson et al. | | 359/291 |
| 6,650,461 B1 * | 11/2003 | Atobe et al. | | 359/291 |
| 6,666,561 B1 * | 12/2003 | Blakley | | 359/224 |
| 2003/0016435 A1 * | 1/2003 | Atobe et al. | | 359/295 |
| 2004/0240033 A1 * | 12/2004 | Pan et al. | | 359/291 |
| 2005/0117196 A1 * | 6/2005 | Kimura et al. | | 359/291 |

FOREIGN PATENT DOCUMENTS

JP 8-334709 A 12/1996
JP 2000-214397 A 8/2000

OTHER PUBLICATIONS

"Dual-Mode micromirrors for Optical Phased Array Applications", by U.Krishnamoorthy, et al., Transducers 01 Eurosensors XV, The 11$^{th}$ International Conference on Solid-State Sensors and Actuators, Munich, Germany, Jun. 10-14, 2001.

* cited by examiner

*Primary Examiner*—Evelyn A. Lester
(74) *Attorney, Agent, or Firm*—Sughrue Mion, PLLC

(57) ABSTRACT

A reflection-type light modulating array element has: a substrate; a movable member provided with a beam body provided on the substrate through a first gap, a light reflector capable of rotational displacement by twisting of the beam body, and an electrically conducting part formed at least in a partial portion of the movable member; a lower electrode provided on a substrate side to face the movable member through the first gap, and an upper electrode provided on a side opposite to the lower electrode to face the movable member through a second gap, and thereby the movable member is between the lower electrode and the upper electrode, wherein a voltage is applied to the upper electrode, the lower electrode and the electrically conducting part to cause an rocking displacement of the light reflector and thereby deflect a reflection direction of a light.

7 Claims, 21 Drawing Sheets

PRIOR ART

REFLECTION-TYPE LIGHT MODULATING ARRAY ELEMENT AND EXPOSURE APPARATUS

This application is based on Japanese Patent application JP 2003-356709, filed Oct. 16, 2003, the entire content of which is hereby incorporated by reference.

BACKGROUND OF THE INVENTION

1. Technical Field of the Invention

The present invention relates to a reflection-type light modulating array element and an exposure apparatus.

2. Description of the Related Art

The spatial light modulator (SLM) is a device of modulating incident light of a spatial pattern and forming an optical image corresponding to the electrical or optical input. One of SLM is a digital micromirror device (DMD) where a micromirror is produced based on the micromechanic technology and light is deflected by inclining the micromirror. DMD is a monolithic single-chip integrated circuit SLM and comprises, for example, a high-density array of about 16 micron-square movable micromirrors. These mirrors are fabricated over an address circuit and each mirror forms one pixel of the DMD array. This mirror reflects incident light to a projection lens in one of two positions and deflects the incident light to a light absorber in another position. The projection lens focuses the modulated light on a display screen to form an image.

The spatial light modulator 1 disclosed in JP-A-8-334709 (the term "JP-A" as used herein means an "unexamined published Japanese patent application") has, as shown in FIG. 25A, a square mirror 7 entirely supported on and elevated above a yoke 5 by a support post 3. The support post 3 extending downward from the center of the mirror 7 is, as shown in the Figure, fixed along its torsion axis to the center of the yoke 5 and balances the center of mass of the mirror 7 on the yoke 5. When the yoke 5 and the mirror 7 are in the undeflected (flat) state, the yoke 7 is entirely coplanar with the elevated address electrodes 9 and 11 at a distance of about 1 μm above the metal layer including address electrodes 13 and 15 and reset/bias 17. The mirror 7 is elevated above the pair of elevated address electrodes 9 and 11 about 2 μm which is approximately double the distance separating the yoke 5 from the substrate 19.

In this spatial light modulator 1, when a voltage is applied between the mirror 7 and the elevated address electrode 11 and between the yoke 5 and the lower address electrode 15, the electrostatic force generated between respective electrodes causes, as shown in FIG. 25B, the yoke 5 and the mirror 7 to rotate clockwise, and one landing tip 21 of the yoke 5 lands on the lower address electrode 15. According to the electrodes to which a voltage is applied, free rotation to both the left and right directions can be attained.

The light deflecting apparatus 25 disclosed in JP-A-2000-214397 comprises, as shown in FIG. 26A, a deflecting plate 27 having a deflecting plane for deflecting an incident light beam, at least one flexible plate 33 connected at one end to the deflecting plate 27 and at the other end to supporting substrates 29 and 31, and a unit of fixed electrode 35 and driving electrode 37 for displacing the deflecting plate 27. The unit of fixed electrode 35 and driving electrode 37 is consisting of a movable portion (driving electrode 37) provided on the flexible plate 33, and fixed electrodes 35 formed on the sides of supporting substrates 29 and 31, where the flexible plate 33 is driven by the attractive force generated between the driving electrode 37 and the fixed electrode 35 to cause displacement of the deflecting plate 27.

In this light deflecting apparatus 25, when a voltage is applied between the fixed electrode 35 and the driving electrode 37 provided on the flexible plate 33, an electrostatic attractive force is generated between two electrodes 35 and 37. By this electrostatic force, the flexible plate 33 is attracted upward or downward with respect to a substrate 39 for the formation of electrode, as a result, the deflecting plate 27 is, as shown in FIG. 26B, tilted and displaced. For returning the flexible plate 33 to the state of FIG. 26A, an appropriate voltage is applied between the driving electrode 37 and the fixed electrode 35 on the upper side or between the driving electrode 37 and the fixed electrode 35 on the lower side to return the flexible plate 33 to the center position and thereafter, the voltage is turned off.

In the light deflecting apparatus 41 disclosed in Dual-Mode Micromirrors for Optical Phased Array Applications, TRANSDUCERS 01 EUROSENSORS XV (The 11th International Conference on Solid-Sensors and Actuators (2001)), as shown in FIG. 27, a mirror 45 is supported in the center portion of a rocking axis 43, and support axes 47 and 47 are fixed to both ends of the rocking axis 43 in an orthogonal manner. In each of these support axes 47 and 47, a so-called comb drive 49 as driving means is provided at both ends. The comb drive 49 is oriented by alternately inserting a comb teeth-like upper electrode plate 49a and a comb teeth-like lower electrode 49b and due to the electrostatic force generated between these opposing electrodes, both ends of each of the support axes 47 and 47 are moved up and down, as a result, the rocking axis 43 is rotated and thereby the mirror 43 can be rotated freely in both the left and right directions.

However, in the spatial light modulator disclosed in JP-A-8-334709, a two-step structure consisting of a yoke part taking a driving role and a mirror part having an area enlarged with respect to the yoke part is constituted on a torsion hinge so as to obtain a high opening ratio for one pixel mirror of a fine area and therefore, the mass of the entire movable part becomes large, as a result, the moment of inertia is increased and high-speed moving is limited. Furthermore, since the elevated address electrodes and the yoke are coplanarly disposed, the area of each electrode is decreased to give a small electrostatic force both between the pixel mirror and the elevated address electrode and between the yoke and the lower address electrode, and low-voltage and high-speed driving is limited.

In the light deflecting apparatus disclosed in JP-A-2000-214397, the support member (flexible plate) is drawn upward or downward upon displacement of the deflecting plate to cause dogleg bending of the linking part between the flexible plate and the deflecting plate and this gives rise to increase in distortion and reduction in durability.

In the light deflecting apparatus disclosed in Dual-Mode Micromirrors for Optical Phased Array Applications, TRANSDUCERS 01 EUROSENSORS XV, not only the comb drive structure is complicated but also four comb drives are necessary and therefore, a large area is occupied by the drive structure to cause problems that miniaturization and high resolution are difficult to realize and the utility efficiency of light is bad.

SUMMARY OF THE INVENTION

The present invention has been made under these circumstances and a first object of the present invention is to obtain a reflection-type light modulating array element and an exposure apparatus, which can realize low-voltage and high-speed driving and sufficiently high durability. A second object of the present invention is to obtain a reflection-type light modulating array element and an exposure apparatus, which can realize miniaturization, high resolution and high utility efficiency of light.

For achieving the above-described objects, the reflection-type light modulating array element according to the present invention is characterized by comprising a substrate, a movable member comprising a beam body provided on the substrate through a gap and having a light reflector capable of rotational displacement upon twisting of the beam body and an electrically conducting part formed at least in a partial portion, a lower electrode provided on the substrate side to face the movable member through the gap, and an upper electrode provided on the side opposite to the lower electrode to sandwich the movable member and to face the movable member through a gap, wherein a voltage is applied to the upper electrode, the lower electrode and the electrically conducting part to cause rocking displacement of the light reflector and thereby deflect the reflection direction of light.

In this reflection-type light modulating array element, the movable member comprises a twistable beam body having a light reflector and an electrically conducting part, so that the entire movable part can have a small mass and the moment of inertia can be decreased to enable high-speed moving. Also, a lower electrode is provided on the substrate side and an upper electrode is provided on the side opposite to the lower electrode to sandwich the movable member, so that the movable member can be actively rocked by electrostatic forces from above and below without relying on the spring force of the beam body. By virtue of this constitution, the spring force of the beam body, which is necessary in the case of a structure of restoring the movable member by using a spring force, is not required and the driving resistance to be generated upon intensifying the spring force can be reduced, as a result, high-speed and low-voltage driving can be realized. Furthermore, unlike conventional spatial light modulators where elevated address electrodes are disposed coplanarly with the yoke, the movable member having an electrically conducting part is disposed non-coplanarly with lower and upper electrodes and therefore, a large area can be ensured for both the opposing electrodes, so that large electrostatic forces can be applied to the movable member and this also can realize high-speed and low-voltage driving. Still further, unlike conventional light deflecting devices where the linking part between the support member and the deflecting member is bent, the distortion of the beam body can be small and therefore, the durability is enhanced. In addition, unlike conventional elements having a so-called comb drive structure, the structure is simple to facilitate miniaturization and high resolution and also, the area occupied by the drive structure is small (that is, blocking of light by the drive structure-formed site is eliminated) to allow for enhancement in the utility efficiency of light.

Preferably, in the reflection-type light modulating array element, the lower electrode and the upper electrode each is provided on both sides of the beam body.

In this reflection-type light modulating array element, four electrodes in total are provided, that is, two lower electrodes centered on the beam body are provided on the lower side of the beam body and two upper electrodes centered on the beam body are provided on the upper side of the beam body. In other words, the twist center of the beam body is allocated to the intersection of a pair of diagonal lines each connecting diagonal electrodes disposed in up/down and right/left four directions. Accordingly, electrodes for effectively imparting electrostatic forces can be space-savingly provided around the twist center axis of the movable member pivoted on a single axis.

Still preferably, in the reflection-type light modulating array element, the lower electrode comprises a first lower electrode and a second lower electrode provided on both sides of the beam body, the upper electrode comprises a first upper electrode and a second upper electrode provided on both sides of the beam body, the first lower electrode and the first upper electrode and the second lower electrode and the second upper electrode each are provided to face each other through the movable member and the pair of the first lower electrode and the second upper electrode and the pair of the second lower electrode and the first upper electrode each is electrically connected.

In this reflection-type light modulating array element, out of first lower electrode, second lower electrode, first upper electrode and second upper electrode in four directions provided around the twist center axis of the movable member, the pair of first lower electrode and second upper electrode and the pair of second lower electrode and first upper electrode on respective diagonal lines each is electrically connected and when a voltage is applied to these diagonal electrodes and the movable member, rotation moments in the vertically opposite directions can be imparted to left and right two ends of the movable member, which are centered on the twist center, and a large rotational driving force can be obtained. Also, one movement can be controlled by three electrodes.

Still preferably, in the reflection-type light modulating array element, a plurality of the reflection-type light modulating elements are one-dimensionally or two-dimensionally arrayed, the first lower electrode and the second upper electrode work out to a first driving electrode, the second lower electrode and the first upper electrode work out to a second driving electrode, the electrically conducting part of the movable member works out to a movable body electrode, the movable body electrodes of a plurality of the reflection-type light modulating elements are commonly connected, and the reflection-type light modulating elements each is independently driven by applying a voltage to the first driving electrode and the second driving electrode of each reflection-type light modulating element.

In this reflection-type light modulating array element, out of three members of first driving electrode, second driving electrode and movable body electrode of each reflection-type light modulating element, the movable body electrode is connected by common wiring and each reflection-type light modulating element is independently driven and controlled by other two members of first driving electrode and second driving electrode. Accordingly, in a reflection-type light modulating array element having n reflection-type light modulating elements, a wiring pattern can be formed to give a number of wiring lines as small as 2×n+1 instead of the original number 3×n of wiring lines.

Still preferably, in the reflection-type light modulating array element, a top plate is disposed to face the substrate with a space and provided with the upper electrode on a bottom surface thereof, and end parts in the extending direction of the beam body, which work out to support parts, each is sandwichedly held by a lower spacer intervening between the end part and the substrate and an upper spacer intervening between the end part and the top plate.

In this reflection-type light modulating array element, both end parts in the extending direction (the direction along the twist center 77 axis) of the beam body, which come to swingablly support the movable member, are sandwiched by a lower spacer and an upper spacer, and these lower and upper spacers are sandwichedly held by the substrate and the top plate, so that both ends of the beam body, which work out to support parts for the movable member, can be enhanced in rigidity and toughness.

Still preferably, in the reflection-type light modulating array element, a microlens array having formed therein a plurality of microlenses is provided and the microlenses are disposed to face respective light reflectors of the reflection-type light modulating elements which are one-dimensionally or two-dimensionally arrayed.

In this reflection-type light modulating array element, the light converged by a microlens is injected into the light reflector of the movable member. In an element having no microlens, when an upper electrode is disposed on the light injection side of the light reflector, the opening area allowing for injection of light into the reflection-type light modulating element becomes small and the incident light is blocked (or the intensity is reduced) by the upper electrode to decrease the utility efficiency of light. On the other hand, when light converged by a microlens is injected into the light reflector as in the constitution of this embodiment, even with a small opening area, the incident light can be injected into the light reflector without being blocked by the upper electrode, whereby the utility efficiency of light is enhanced and even when the opening area is small, bright deflected light can be obtained with high efficiency.

An exposure apparatus of the present invention is characterized by comprising the reflection-type light modulating array element as described above, wherein light from a light source is injected into the reflection-type light modulating array element through an illumination optical system and the microlens array, and the reflected light reflected by the reflection-type light modulating array element is again injected into a projection optical system through the microlens array and at the same time, transmitted through the projection optical system and irradiated on an exposure object.

In this exposure apparatus, high-speed and low-voltage driving and in turn high-speed writing can be realized. Furthermore, the irradiation region of the light modulating element is narrowed down by the microlens array and therefore, the utility efficiency of light can be enhanced.

According to the reflection-type light modulating array element of the present invention, the movable member of each element comprises a twistable beam body having a light reflector and an electrically conducting part, so that the entire movable part can have a small mass and the moment of inertia can be decreased to enable high-speed moving. Also, a lower electrode is provided on the substrate side and an upper electrode is provided on the side opposite to the lower electrode to sandwich the movable member, so that the movable member can be actively rocked by electrostatic forces from above and below without relying on the spring force of the beam body. By virtue of this constitution, the beam body need not have a strong spring force and the driving resistance to be generated upon intensifying the spring force can be reduced, as a result, high-speed and low-voltage driving can be performed. Furthermore, unlike conventional spatial light modulators where elevated address electrodes are disposed coplanarly with the yoke, the movable member having an electrically conducting part can be disposed non-coplanarly with lower and upper electrodes and therefore, a large area can be ensured for both the opposing electrodes, so that large electrostatic forces can be made to act on the movable member and this also can realize high-speed and low-voltage driving. Still further, unlike conventional light deflecting devices where the linking part between the support member and the deflecting member is bent, the distortion of the beam body can be made small to enhance the durability. In addition, unlike conventional elements having a so-called comb drive structure, the structure can be made simple to facilitate miniaturization and high resolution and also, the area occupied by the drive structure can be made small to allow for enhancement in the utility efficiency of light.

When reflection-type light modulating elements having the same structure are one-dimensionally or two-dimensionally arrayed on the same substrate, this functions as one reflection-type light modulating device. For example, in the array formation for a display device or an exposure device, many elements can be homogeneously and highly precisely disposed by a semiconductor step and the light output from respective reflection-type light modulating elements corresponding to pixels can be readily uniformalized in view of intensity, phase and position, so that high resolution and high scan precision can be obtained.

According to the exposure apparatus of the present invention, the reflection-type light modulating array element of the present invention is used and therefore, high-speed and low-voltage driving and in turn high-speed writing can be realized. Furthermore, the irradiation region of the light modulating element is narrowed down by the microlens array and therefore, the utility efficiency of light can be enhanced.

BRIEF DESCRIPTION OF THE DRAWINGS

FIGS. 7A to 7F show the process in respective cross sections IIA—IIA and IIC—IIC.

DETAILED DESCRIPTION OF THE INVENTION

Figure 1:
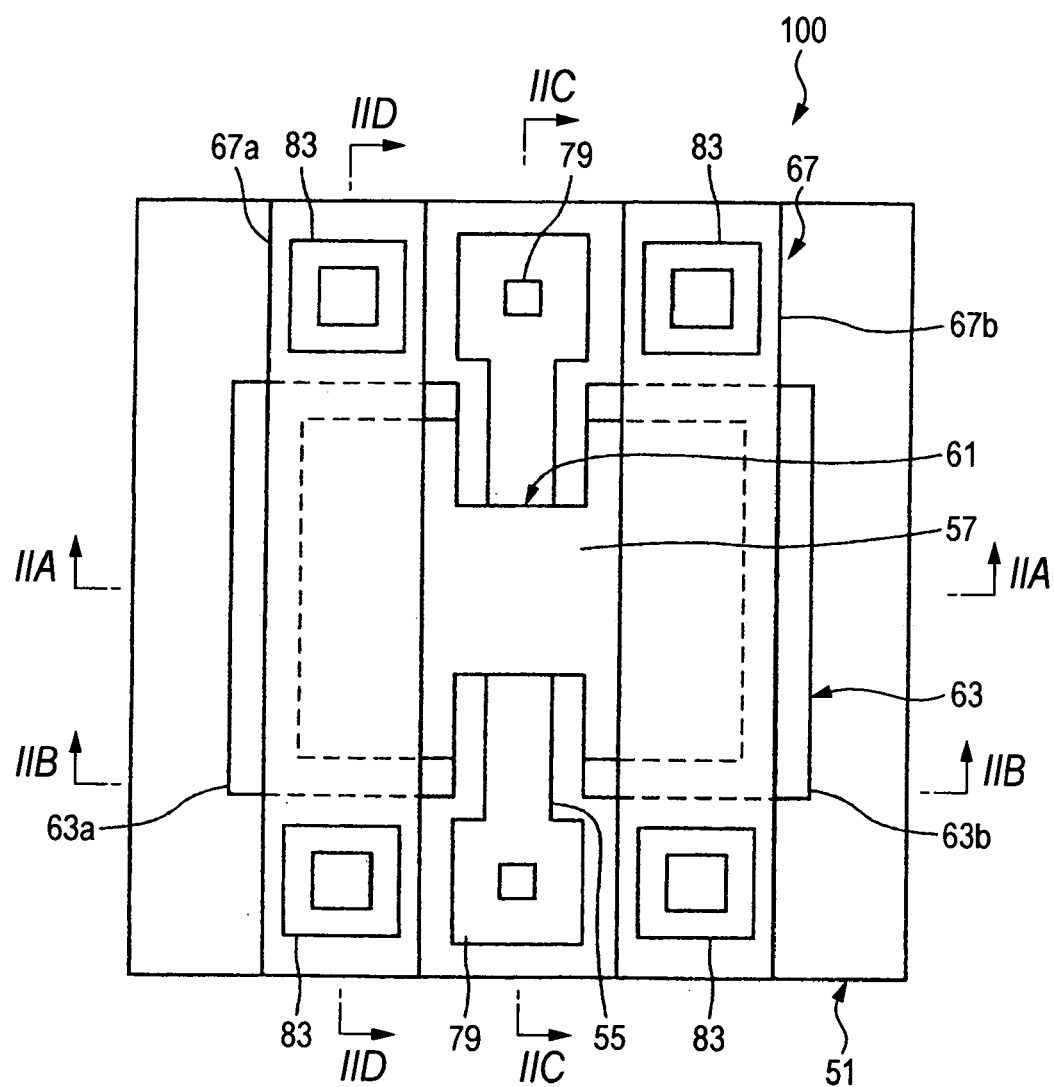
FIG. 1 is a plan view showing a first embodiment of the reflection-type light modulating element constituting the reflection-type light modulating array element according to the present invention.
Figure 2A:
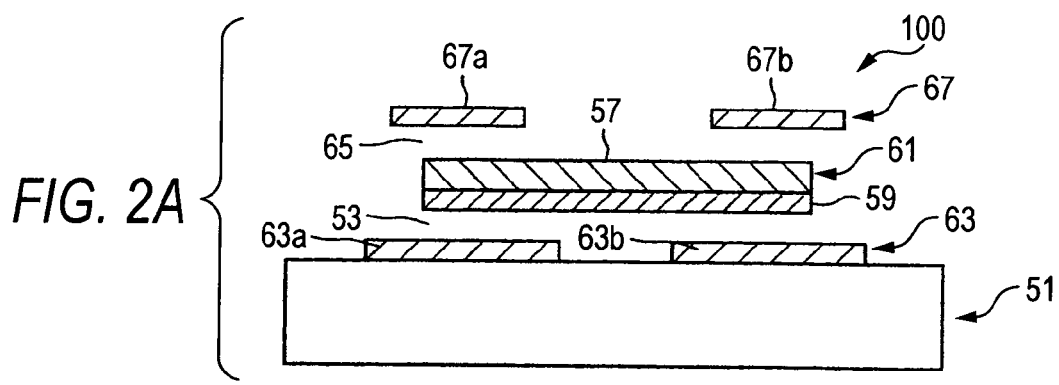
FIGS. 2A, 2B, 2C and 2D are cross-sectional views in the sections IIA—IIA, IIB—IIB, IIC—IIC and IID—IID of FIG. 1, respectively.
Figure 2B:
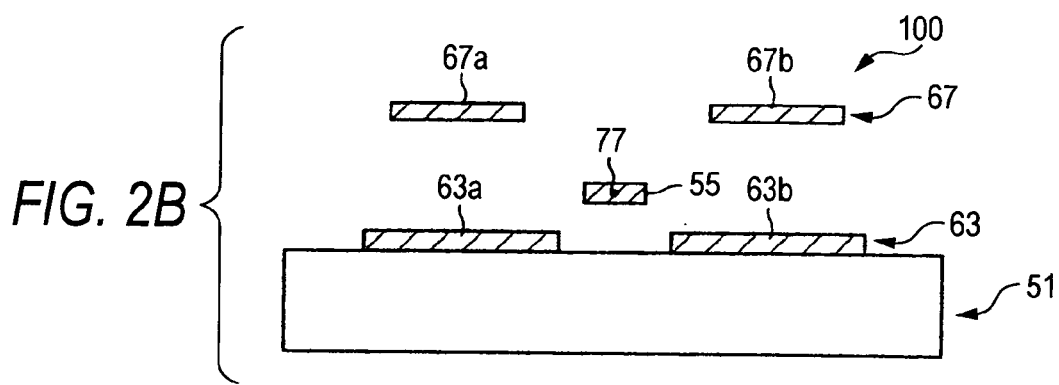
Figure 2C:
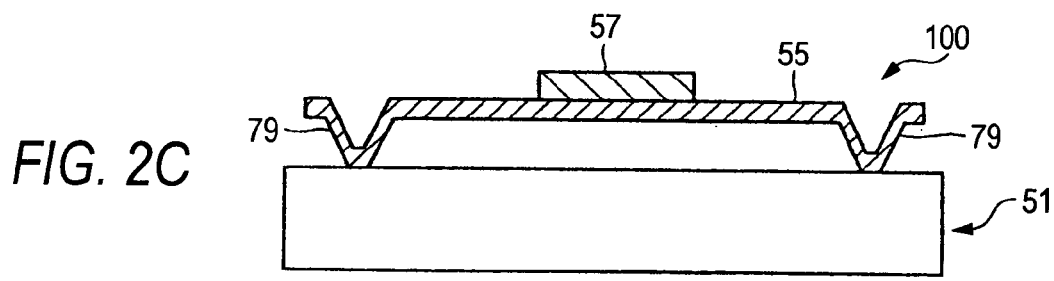
Figure 2D:
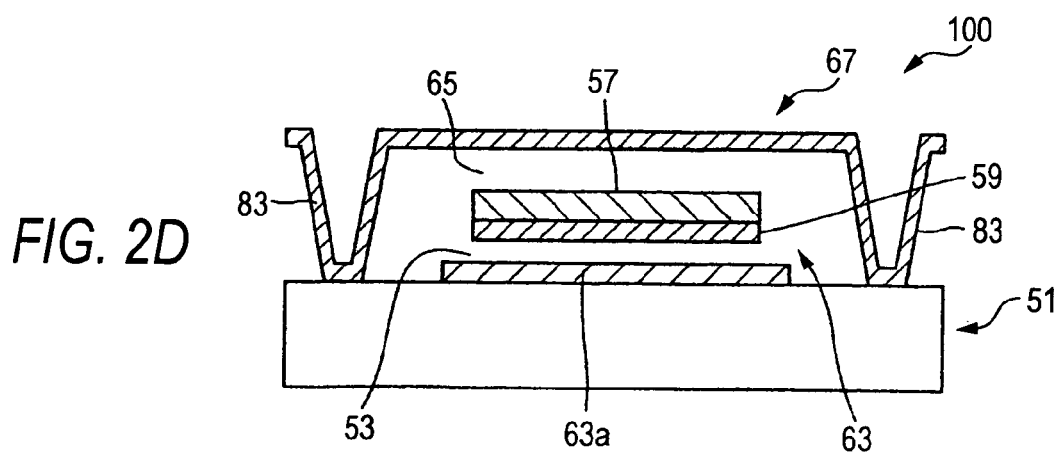

Preferred embodiments of the reflection-type light modulating array element and exposure apparatus of the present invention are described in detail below by referring to the drawings.

Figure 3:
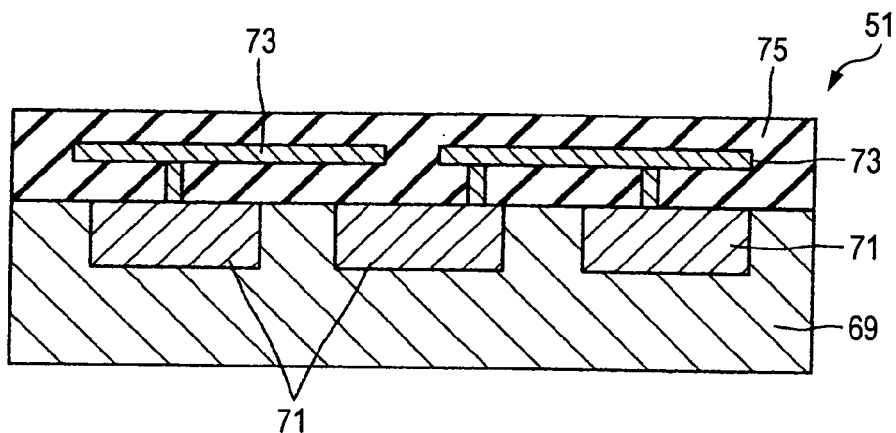
FIG. 3 is a cross-sectional view of the substrate shown in FIG. 1.
Figure 4:
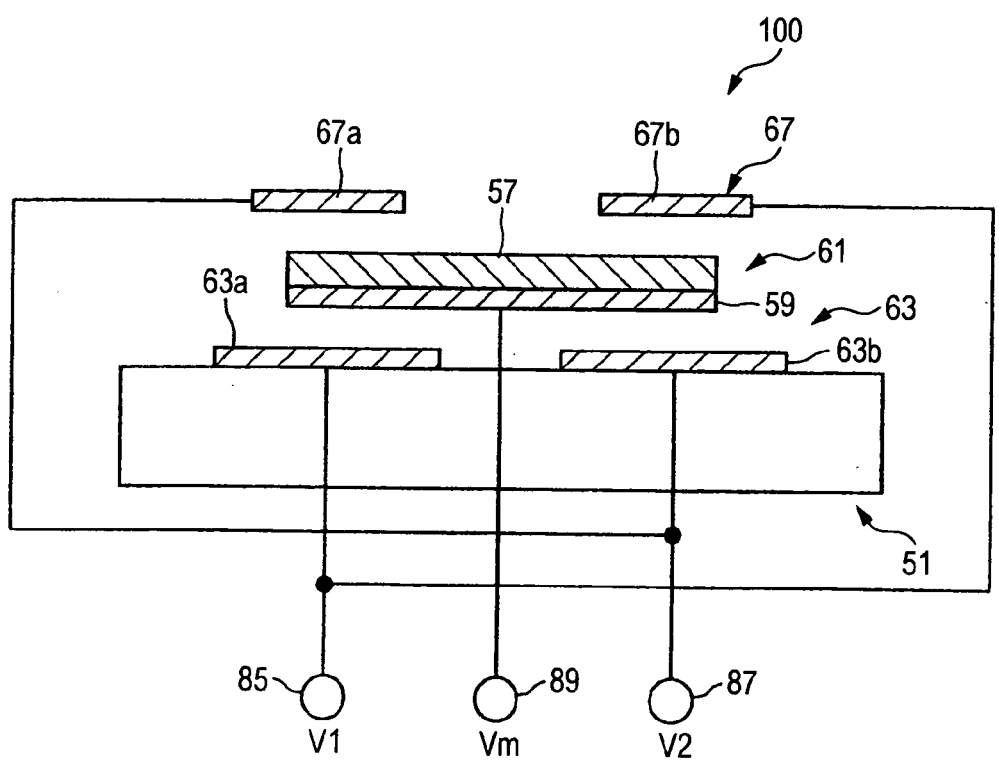
FIG. 4 is an electrode wiring diagram of the reflection-type light modulating element shown in FIG. 1.

FIG. 1 is a plan view showing a first embodiment of the reflection-type light modulating element constituting the reflection-type light modulating array element of the present invention, FIGS. 2A, 2B, 2C and 2D are cross-sectional views in the sections 2A—2A, 2B—2B, 2C—2C and 2D—2D of FIG. 1, respectively, FIG. 3 is a cross-sectional view of the substrate shown in FIG. 1, and FIG. 4 is an electrode wiring diagram of the reflection-type light modulating element shown in FIG. 1.

As shown in FIGS. 1 and 2A to 2D, the reflection-type light modulating element 100 constituting the reflection-type light modulating array element according to this embodiment comprises, as fundamental constituent elements, a substrate 51, a movable member 61 comprising a beam body (hereinafter also referred to as a "hinge") 55 provided on the substrate 51 through a gap 53 and having a light reflector (hereinafter also referred to as a "mirror part") 57 capable of rotational displacement upon twisting of the hinge 55 and an electrically conducting part 59 formed at least in a partial portion, a lower electrode 63 provided on the substrate 51 side opposite to the movable member 61 through the gap 53, and an upper electrode 67 provided on the side opposite to the lower electrode 63 to sandwich the movable member 61 and face the movable member 61 through a gap 65.

For the substrate 51, any material such as Si substrate and glass substrate may be used. A specific preferred example is a substrate where, as in this embodiment shown in FIG. 3, circuits (usually, CMOS circuit 71 and its wiring circuit 73) for driving the element are formed on an Si substrate 69 and the top surface thereof is flattened by an insulating layer 75. Incidentally, the above-described movable member 61, lower electrode 63 and upper electrode 67 which are provided on the top surface of the flattened insulating layer 75 are each electrically connected through a contact hole (not shown) provided in the insulating layer 75.

The lower electrode 63 comprises a first lower electrode 63a and a second lower electrode 63b provided on both sides of the hinge 55, and the upper electrode 67 comprises a first upper electrode 67a and a second upper electrode 67b provided on both sides of the hinge 55. That is, the lower electrode 63 and the upper electrode 67 each is provided on both sides of the hinge 55.

More specifically, two lower electrodes (first lower electrode 63a and second lower electrode 63b) centered on the hinge 55 are provided on the lower side of the hinge 55 and two upper electrodes (first upper electrode 67a and second upper electrode 67b) centered on the hinge 55 are provided on the upper side of the hinge 55. Thus, four electrodes in total are provided. In other words, the twist center 77 of the hinge is allocated to the intersection of a pair of diagonal lines each connecting diagonal electrodes (one connecting first lower electrode 63a and second upper electrode 67 and another connecting second lower electrode 63b and first upper electrode 67a) disposed in up/down and right/left four directions. Accordingly, electrodes (first lower electrode 63a, second lower electrode 63b, first upper electrode 67a and second upper electrode 67b) for effectively imparting electrostatic forces can be space-savingly provided around the twist center 77 axis of the movable member 61 pivoted on a single axis.

The first lower electrode 63a and the second lower electrode 63b are fixedly formed on the substrate 51. The first lower electrode 63a and the second lower electrode 63b each may be formed of any material such as metal and semiconductor as long as it has electrical conductivity. Also, an insulating layer may be provided on these electrodes.

The hinge 55 is formed above the first lower electrode 63a and the second lower electrode 63b through a gap 53 to run nearly in parallel to the substrate 51. Both ends of the hinge 55 are fixed by support parts 79 of the hinge 55. The support part 79 can have a nearly quadrangular pyramid shape obtained by denting the end part of the hinge 55 formed like a band plate. Accordingly, the cross-sectional shape of the support part 79 becomes an inverse triangle having a flat part on the bottom. The hinge 55 is connected at this flat part to the wiring circuit 73 through a contact hole (not shown) pierced in the insulating layer 75. The positions of the first lower electrode 63a and the second lower electrode 63b are disposed almost symmetrically with respect to the twist center 77 of the hinge 55. The hinge 55 may be formed of any material as long as it has electrically conductivity. For example, a metal or a semiconductor is suitably used. A composite material of an insulating material and an electrically conducting material may also be used.

The hinge 55 is fixed at its both ends and can be rotation-displaced around the hinge axis upon twisting of the hinge 55 itself. The elastic force thereof is freely determined according to the shape (thickness, width, length) of the hinge 55 and the physical properties (e.g., Young's modulus, Poisson's ratio) of the material. Incidentally, the movable member 61 can be actively driven to rotate right or left by electrostatic forces from electrodes provided in the up/down directions and therefore, the elastic force of the hinge 55 can be set small. The structure of the support part 79 of the hinge 55 is sufficient as long as the support part is fixed to the substrate 5, and therefore any structure other than that in this embodiment can be employed.

In the center part of the movable member 61, a mirror part 57 is formed integrally with the hinge 55. The mirror part 57 can be rotation-displaced (rocked) around the twist center 77 of the hinge 55. The center part of the hinge 55 has a wing shape enlarged in the width with respect to both ends and extending toward the horizontal right and left directions (right and left directions in FIG. 1), and the front and rear parts of each of the wings on right and left sides are extending along the hinge 55 to form a nearly H shape in plan view. The mirror part 57 has an H shape nearly the same as the hinge center part. The mirror part 57 or each of the mirror part 57 and the hinge 55 comprises a metal, a semiconductor or the like and has electrical conductivity, and the surface (light injection surface) on the side opposite to the substrate 5 has reflecting property.

The mirror part 57 may comprise a composite material of an electrically conducting material and an insulating material. For example, after forming the mirror part 57 from an electrically conducting material such as metal or semiconductor integrally with or separately from the hinge 55, a multilayer film mirror may be stacked thereon. The multilayer film mirror may be, for example, an interference mirror which is a multilayer film of dielectric material or a multilayer film of dielectric material/metal. Use of this mirror can provide an effect of reducing the absorption of incident light on the reflection surface as much as possible and remarkably increasing the reflectance or an effect of reflecting light at a specific wavelength. Also, the mirror part 57 may comprise a composite material of an electrically conducting material and an insulating material, and a reflective member may be formed in a partial portion of the mirror part 57. The mirror part 57 may also comprise the same material as the hinge 55. In the present embodiment, an electrically conducting part 59 is formed in a partial portion of the mirror part 57 having any one of these constitutions.

The mirror part 57 or each of the mirror part 57 and the hinge 55 has electrical conductivity and can be electrically connected to the substrate 51 through the support parts 79 of the hinge 55. As described above, the mirror part 57 and the hinge 55 each may have any structure and may comprise any material as long as the mirror part 57 can be rotation-displaced around the hinge axis (twist center 77) owing to the hinge structure and the mirror part 57 or each of the mirror part 57 and the hinge 55 has electrical conductivity and can be electrically connected to the substrate 51 through the support part 79.

The first upper electrode 67a and the second upper electrode 67b are formed above the mirror part 57 and the hinge 55 through a gap 65 to run nearly in parallel to the substrate 51. Both electrodes are sufficient as long as these are formed of a material having electrical conductivity, such as metal or semiconductor. In both electrodes, a support part 83 having nearly the same shape as the support part 79 is formed at both end parts and the electrode is supported by the substrate 51 through the support parts 83. Accordingly, in these first upper electrode 67a and second upper electrode 67b, similarly to the hinge 55, the support part 83 is electrically connected to the wiring circuit 73 through a contact hole (not shown) pierced in the substrate 51.

The positions of the first upper electrode 67a and the second upper electrode 67b are disposed symmetrically with respect to the twist center 77 of the hinge 55. The first upper electrode 67a and the second upper electrode 67b may also be disposed to face the mirror part 67 through a gap 65 by forming another fixed material (for example, another substrate). Both electrodes are supported while reserving structural rigidity for causing no or small relative displacement as compared with the hinge 55 and the mirror part 57.

As shown in FIG. 4, in the reflection-type light modulating element 100, the first lower electrode 63a and the second upper electrode 67b are electrically connected and thereby function as a first driving electrode 85, the second lower electrode 63b and the first upper electrode 67a are electrically connected and thereby function as a second driving electrode 78, and the electrically conducting part 59 of the movable member 61 functions as a movable body electrode 89.

Out of first lower electrode 63a, second lower electrode 63b, first upper electrode 67a and second upper electrode 67b in the four directions provided around the twist center 77 axis of the movable member 61, the pair of the first lower electrode 63a and the second upper electrode 67b and the pair of the second lower electrode 63b and the first upper electrode 67a on respective diagonal lines each is electrically connected and when a voltage is applied to these diagonal electrodes and the electrically conducting part 59 of the movable member 61, rotation moments in the vertically (up and down of FIG. 2A) opposite directions can be imparted to two ends of the movable member 61 in the left and right directions (left and right directions of FIG. 1), which are centered on the twist center 77, and a large rotational driving force can be obtained. Also, one movement can be controlled by three electrodes.

The operation of the thus-constituted reflection-type light modulating element 100 is described below.

Figure 5:
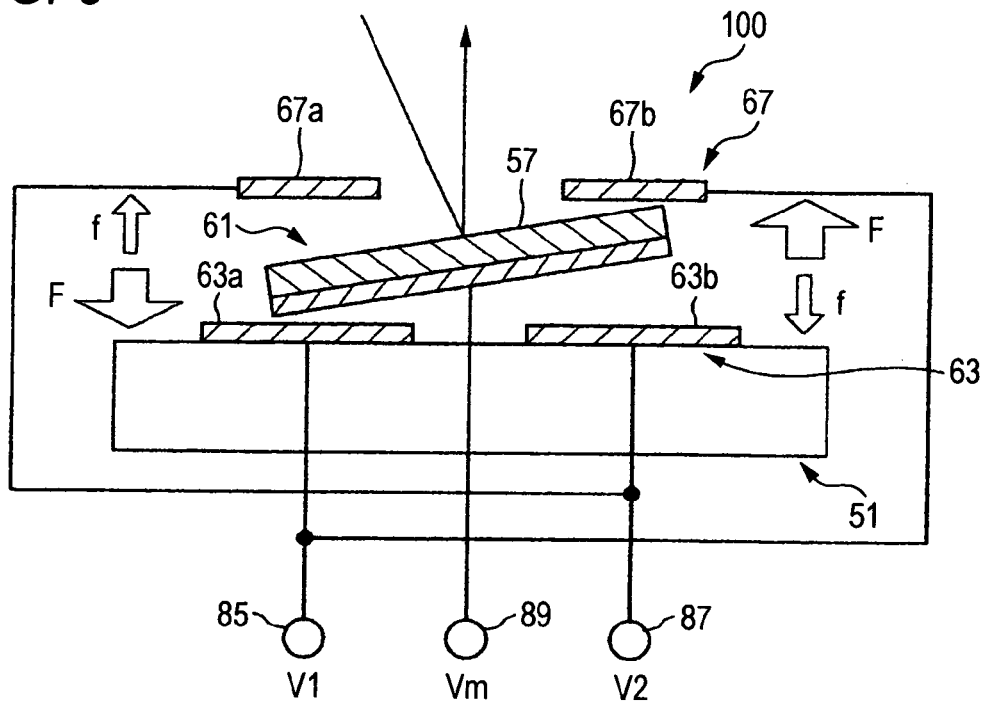
FIG. 5 is an operation explanatory view showing the state where the reflection-type light modulating element shown in FIG. 1 is tilted to the left side.
Figure 6:
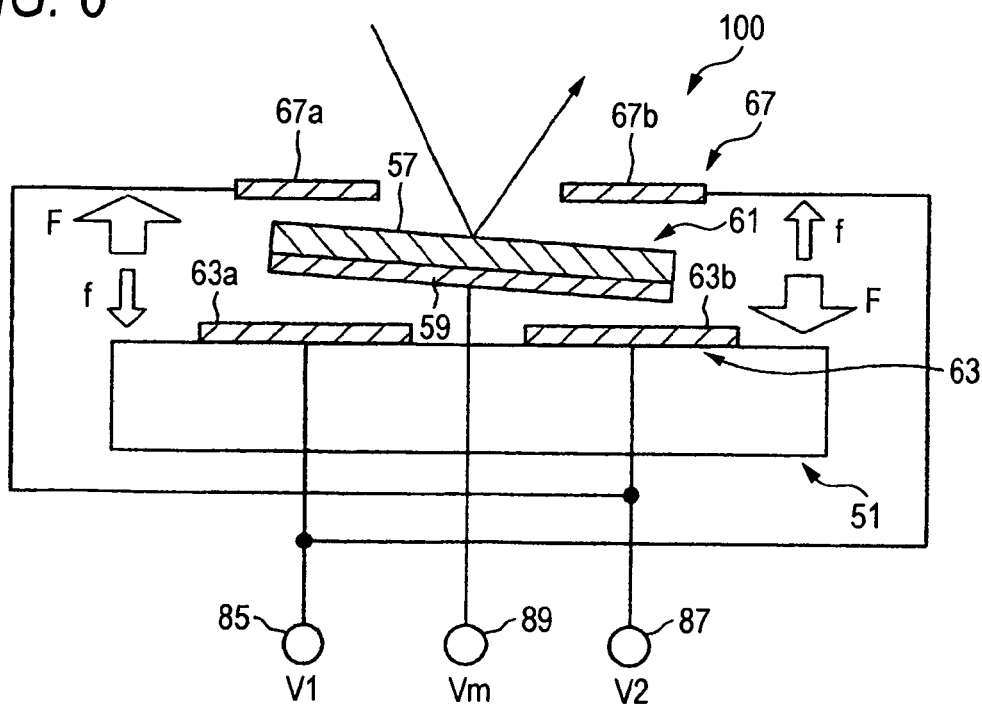
FIG. 6 is an operation explanatory view showing the state where the reflection-type light modulating element shown in FIG. 1 is tilted to the right side.

FIG. 5 is an operation explanatory view showing the state where the reflection-type light modulating element shown in FIG. 1 is tilted to the left side, and FIG. 6 is an operation explanatory view showing the state where the reflection-type light modulating element shown in FIG. 1 is tilted to the right side.

The reflection-type light modulating element 100 has a basic operation that when a voltage is applied to lower electrode 63, upper electrode 67 and electrically conducting part 59, the mirror part 57 undergoes rocking displacement to deflect the reflection direction of light.

More specifically, when a potential difference with respect to the electrically conducting material (electrically conducting part 59) of the mirror part hinge composite material is given to first lower electrode 63a, second lower electrode 63b, first upper electrode 67a and second upper electrode 67b, an electrostatic force is generated between each electrode and the electrically conducting material of the mirror part hinge composite material to yield a rotation torque acting around the twist center 77 (see, FIG. 2B) axis of the hinge 55. Accordingly, the mirror part 57 can be rotation-displaced by controlling the potential of each electrode. The displacement position is determined by the state of the mirror part 57, the electrostatic force generated from each electrode at that time, and the elastic force of the hinge 55.

For example, as shown in FIG. 4, a potential V1 is applied to the first driving electrode 85 formed by connecting the first lower electrode 63$a$ and the second upper electrode 67$b$ on the substrate 51. Also, a potential V2 is applied to the second driving electrode 87 formed by connecting the second lower electrode 63$b$ and the first upper electrode 67$a$ on the substrate 51. Furthermore, a potential Vm is applied to the movable body electrode 89 which is the electrically conducting part 59 of the mirror part 57 and hinge 55. The potentials V1, V2 and Vm are supplied and controlled by a semiconductor integrated circuit (for example, CMOS circuit 71) formed on the substrate 51.

Here, the potential difference of V1 with respect to Vm is denoted as V(1) and the potential difference of V2 for Vm is denoted as V(2). When V(1)=V(2)=0, the external force generated in the mirror part 57 is 0 and the condition at the formation of the element is maintained, where the mirror part 57 is, as shown in FIG. 4, nearly in parallel to the substrate 51. This condition is stably maintained by virtue of the elastic force of the hinge 55.

When V(1)=V(2)≠0, the electrostatic forces generated in the mirror part 57 are symmetrically centered on the twist center 77 of the hinge 55 and the condition at the formation of the element is also maintained, where the mirror part 57 is nearly in parallel to the substrate 51.

When at least one of V(1) and V(2) is not zero and these potential differences are different from each other, the electrostatic forces are asymmetrically centered on the twist center 77 axis of the hinge 55 and the mirror part 57 is tilted with respect to the substrate 51.

For example, when V(1)>V(2), as shown in FIG. 5, the electrostatic forces F generated by the first lower electrode 63$a$ and the second upper electrode 67$b$ become larger than the electrostatic forces f generated by the second lower electrode 63$b$ and the first upper electrode 67$a$, and the mirror part 57 is tilted to the left side. Inversely, when V(1)<V(2), as shown in FIG. 6, the electrostatic forces F generated by the second lower electrode 63$b$ and the first upper electrode 67$a$ become larger than the electrostatic forces f generated by the first lower electrode 63$a$ and the second upper electrode 67$b$, and the mirror part 57 is tilted to the right side.

At this time, when V(1) and V(2) are sufficiently large, even if the difference between V(1) and V(2) is small, the mirror part 57 can be easily rotation-displaced in an arbitrary direction from the flat state. This is advantageous in that when, for example, the potentials to be controlled are V1 and V2, the potential difference therebetween can be small and the voltage of the control circuit can be in turn made low, as a result, a beneficial effect is brought about in view of cost or integration.

In this way, when a potential is appropriately supplied to V1, V2 and Vm, by virtue of the electrostatic forces generated in respective electrodes and the elastic force of the hinge 55, the mirror part 57 can be displaced to an arbitrary position such as clockwise rotation, counterclockwise rotation or flat. At this time, the driving method may be either analogue control (control to an arbitrary displacement) or digital control (control to, for example, a binary displacement).

In the driving for rotation, the rotation angle can be controlled with good precision by providing an appropriate rotation stopper and rotation-displacing the mirror part 57 until contacting with the stopper. Also, when a linear region having displacement property with the voltage is used, the mirror part 57 can be rotation-displaced without contacting the stopper. In this case, since the contact part is not present, problems such as sticking are not caused and the reliability can be elevated. Incidentally, the above-described operation method for displacing the mirror part 57 by the electrode wiring and the control of each potential is one example and the present invention is not limited thereto.

The production method of the reflection-type light modulating element 100 is described below.

Figure 7:
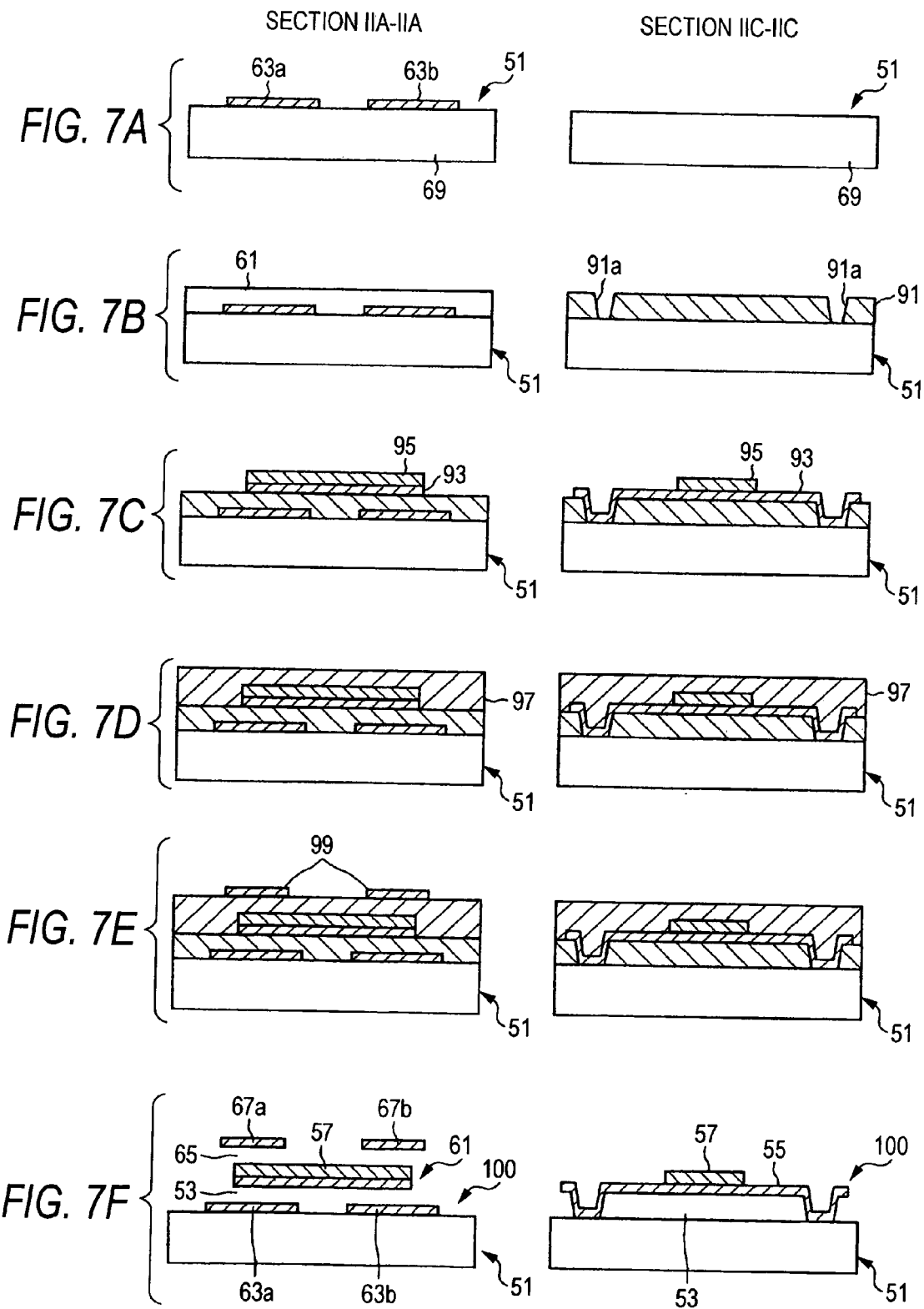
FIGS. 7A to 7F are explanatory views showing an example of the production process of the reflection-type light modulating element shown in FIG. 1, where

FIG. 7 is an explanatory view showing an example of the production process of the reflection-type light modulating element shown in FIG. 1, and FIGS. 7A to 7F show the process in respective cross sections IIA—IIA and IIC— IIC.

As shown in FIG. 7A, the driving circuit substrate 51 is constituted by forming a CMOS circuit 71 (see, FIG. 3) on a Si substrate 69, forming thereon a first SiO$_2$ insulating film (not shown), flattening the surface thereof with CMP or the like, and then forming contact holes for connecting the output of the driving circuit to each electrode of the element.

A first aluminum thin-film (preferably an aluminum alloy containing a high melting-point metal) (not shown) is formed by sputtering on the driving circuit substrate 51 and then a desired electrode shape is patterned by normal photolithographic etching to form a first lower electrode 63$a$ and a second lower electrode 63$b$. At this time, contact holes are formed in the insulating layer 75 (see, FIG. 3), and the first lower electrode 63$a$ and the second lower electrode 63$b$ both are connected to the output of the CMOS circuit 71 through the wiring circuit 73 so that a potential can be supplied to each electrode.

As shown in FIG. 7B, a first positive resist 91 is coated and portions 91$a$ working out to the support parts 79 of the hinge 55 are patterned and hard baked. By virtue of the surface tension at the resist film formation, the resist surface is flattened despite unevenness of the underlying film. This first resist layer functions as a sacrifice layer and is removed in the step described later. Accordingly, the film thickness of the resist after hard baking determines the intending gap 53 between the lower electrode 63 and the hinge 55 (and mirror part 57). Instead of the resist 91, a photosensitive polyimide can also be used.

As shown in FIG. 7C, a second aluminum thin film (preferably an aluminum alloy containing a high melting-point metal) 93 working out to the hinge 55 and the support parts 79 thereof is formed by sputtering and then, an SiO$_2$ film (not shown) is formed by PE-CVD (plasma CVD). This SiO$_2$ film functions as an etching mask of the second aluminum thin film 93. Thereafter, the SiO$_2$ film is patterned by photolithographic etching to give desired shapes of hinge 55 and support parts 79 thereof.

Subsequently, a third aluminum thin film (preferably an aluminum alloy containing a high melting-point metal) 95 working out to the mirror part 57 is formed by sputtering and then, an SiO$_2$ film (not shown) is formed by PE-CVD (plasma CVD). This SiO$_2$ film functions as an etching mask of the third aluminum thin film 95. Thereafter, the SiO$_2$ film is patterned by photolithographic etching to give a desired mirror part shape.

Finally, the third aluminum thin film 95 and the second aluminum thin film 93 are continuously etched by using the SiO$_2$ film as the etching mask and then, the SiO$_2$ film is removed by plasma etching. Incidentally, the etching of the aluminum thin film is performed by wet etching using aluminum etchant (a mixed aqueous solution of phosphoric acid, nitric acid and acetic acid) or by plasma etching using a chlorine-based gas. In the first $SiO_2$ insulating film, contact holes are formed to connect the hinge 55 (mirror part 57) to the output of the driving circuit and allow for supply of a potential.

As shown in FIG. 7D, a second positive resist 97 is coated and the portions working out to the support parts 83 of the upper electrode 67 are patterned and hard baked. By virtue of the reflow effect at the baking, the resist surface is flattened despite unevenness of the underlying film. This second resist layer 97 functions as a sacrifice layer and is removed in the step described later. Accordingly, the film thickness of the second resist layer 97 after hard baking determines the intending gap 65 between the hinge 55 (and mirror part 57) and the upper electrode 67. Instead of the resist, a photosensitive polyimide can also be used.

As shown in FIG. 7E, a fourth aluminum thin film (preferably an aluminum alloy containing a high melting-point metal) 99 working out to the upper electrode 67 and the support parts 83 thereof is formed by sputtering and then, the fourth aluminum thin film 99 is patterned by photolithographic etching to give desired shapes of upper electrode 67 and support parts 83 thereof. The etching of aluminum is performed by wet etching using aluminum etchant (a mixed aqueous solution of phosphoric acid, nitric acid and acetic acid) or by plasma etching using a chlorine-based gas. At this time, the first upper electrode 67a and the second upper electrode 67b are connected to the second lower electrode 63b and the first lower electrode 63a, respectively, on the driving substrate 51.

As shown in FIG. 7F, the second resist layer 97 and the first resist layer 91 which are sacrifice layers are removed by oxygen gas-type plasma etching to form gaps 53 and 65. As a result, a reflection-type light modulating element 100 where a movable member 61 is disposed through a gap on a substrate 51 having provided thereon a first lower electrode 63a and a second lower electrode 63b and in the upper part of this movable member 61, a first upper electrode 67a and a second upper electrode 67b are further disposed through a gap 65 is obtained.

Other than the process described above, the production method of the reflection-type light modulating element 100 allows for the following process variations.

The hinge 55 and the mirror part 57 may be constituted by a single aluminum thin film. This is advantageous in that the steps can be reduced, though the thickness of the hinge 55 and the thickness of the mirror part 57 become equal.

The constructional material of lower electrode 63, upper electrode 67 and hinge 55 may be a material having electrical conductivity other than aluminum. For example, crystalline Si, polycrystalline Si, a metal (e.g., Cr, Mo, Ta, Ni), metal silicide or an electrically conducting organic material can be suitably used. On the electrically conducting part 59, a protective insulating film (e.g., $SiO_2$, SiNx) may be stacked. In this case, a hybrid structure obtained by stacking an electrically conducting thin film such as metal on an insulating thin film such as $SiO_2$, SiNx, BSG, metal oxide film or polymer may also be used.

In the above, a resist material is used for the sacrifice layer but the present invention is not limited thereto. For example, a metal such as aluminum or Cu, or an insulating material such as $SiO_2$ is also suitable for the sacrifice layer. In this case, a material free from corrosion or damage upon removing the sacrifice layer is appropriately selected for the constructional material.

As for the method for removing the sacrifice layer, wet etching may also be used depending on the combination of the constructional material and the sacrifice layer, other than the above-described dry etching (plasma etching). In the case of wet etching, the drying in the rinsing drying step after etching is preferably super-critical drying or freeze drying so as not to cause sticking of the structure due to surface tension.

Other than these, the structure, material and process are not limited to those described above as long as the gist of the present invention is observed.

According to the above-described reflection-type light modulating element 100, the movable member 61 comprises a twistable hinge 55 having a mirror part 57 and an electrically conducting part 59, so that the entire movable part can have a small mass and the moment of inertia can be decreased to enable high-speed moving. Also, a lower electrode 63 is provided on the substrate 51 side and an upper electrode 67 is provided on the side opposite to the lower electrode 63 to sandwich the movable member 61, so that the movable member 61 can be actively rocked by electrostatic forces from above and below without relying on the spring force of the hinge 55. By virtue of this constitution, the spring force of the hinge 55, which is necessary in the case of a structure of restoring the movable member 61 by using a spring force, is not required and the driving resistance to be generated upon intensifying the spring force can be reduced, as a result, high-speed and low-voltage driving can be realized.

Figure 25A:
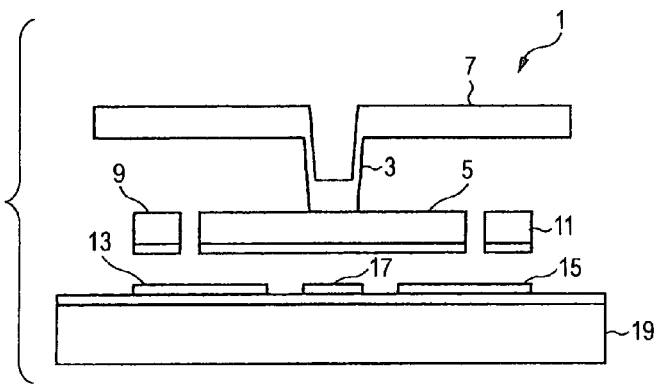
FIGS. 25A and 25B are cross-sectional views of a conventional spatial light modulator where a mirror is provided on a yoke by a two-step structure.
Figure 25B:
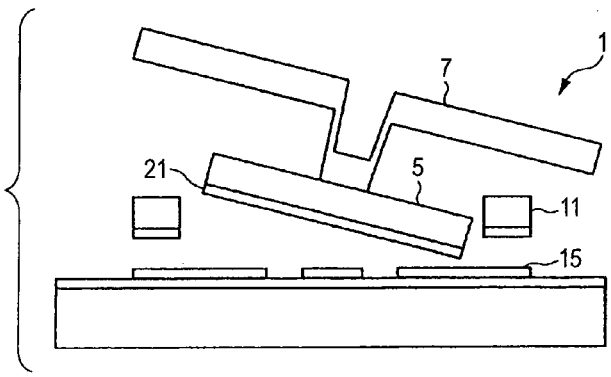

Furthermore, unlike conventional spatial light modulators shown in FIGS. 25A and 25B where elevated address electrodes are disposed coplanarly with the yoke, the movable member 61 having an electrically conducting part 59 is disposed non-coplanarly with lower electrode 63 and upper electrode 67 and therefore, a large area can be ensured for both the opposing electrodes, so that large electrostatic forces can be applied to the movable member and this also can realize high-speed and low-voltage driving.

Figure 26A:
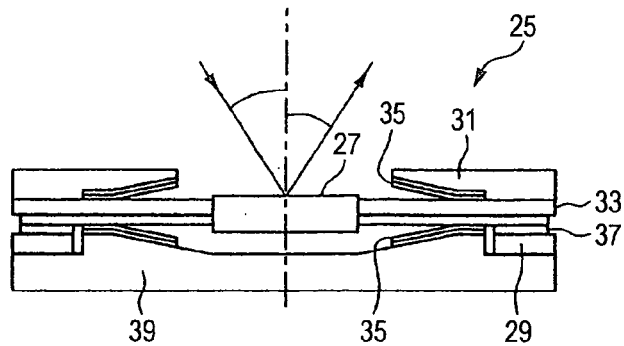
FIGS. 26A and 26B are cross-sectional views of a conventional light deflecting element where a deflecting plate is displaced by bending a flexible plate.
Figure 26B:
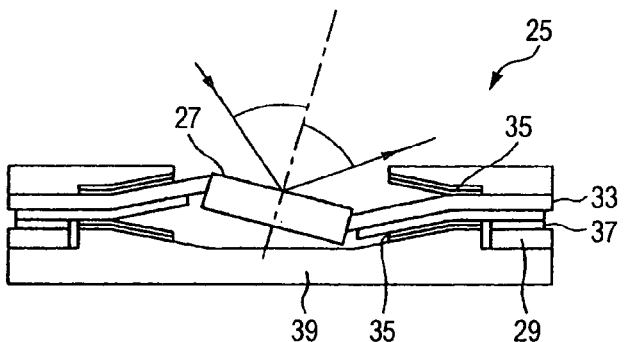
Figure 27:
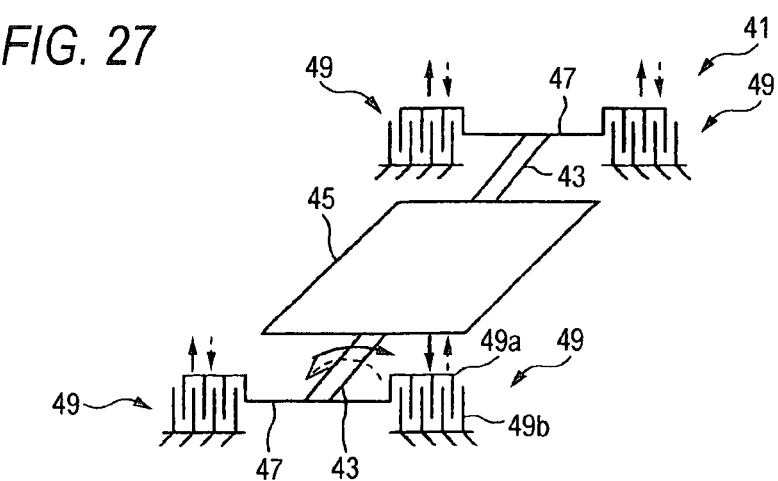
FIG. 27 is a perspective view of a conventional reflection-type light deflecting element equipped with comb drives.

Still further, unlike conventional light deflecting devices shown in FIGS. 26A and 26B where the linking part between the support member and the deflecting member is bent, the distortion of the hinge 55 can be small and therefore, the durability is enhanced. In addition, unlike conventional elements shown in FIG. 27 having a so-called comb drive structure, the structure is simple to facilitate miniaturization and high resolution and also, the area occupied by the drive structure is small (that is, blocking of light by the drive structure-formed site is eliminated) to allow for enhancement in the utility efficiency of light.

The reflection-type light modulating array element according to the second embodiment of the present invention is described below.

Figure 8:
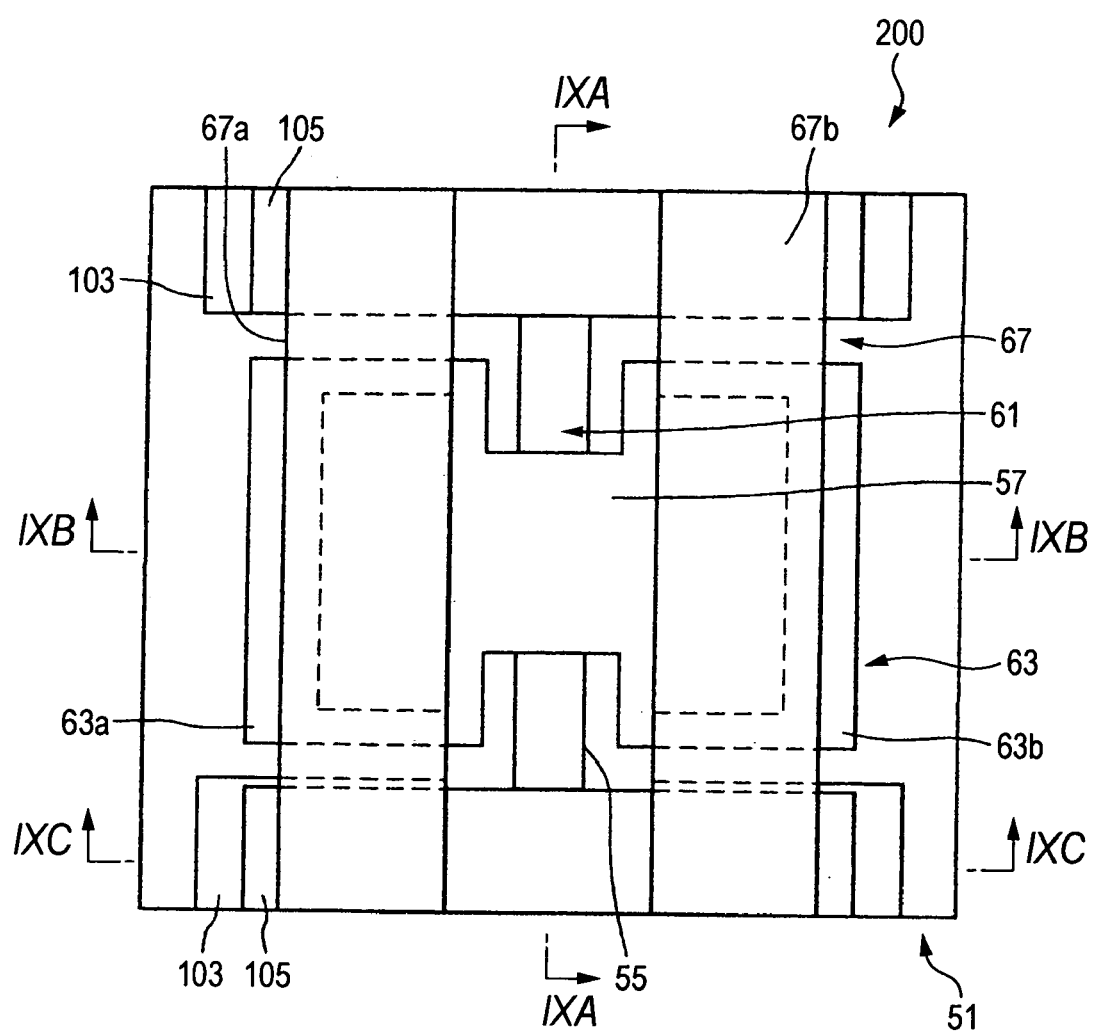
FIG. 8 is a plan view of the reflection-type light modulating element according to the second embodiment where the toughness of the beam body is enhanced.
Figure 9A:
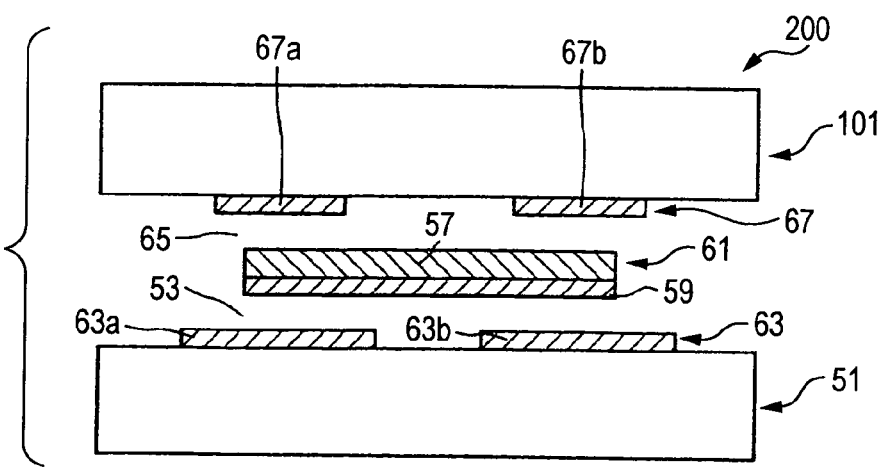
FIGS. 9A, 9B and 9C are cross-sectional views in the sections IXA—IXA, IXB—IXB and IXC—IXC of FIG. 8, respectively.
Figure 9B:
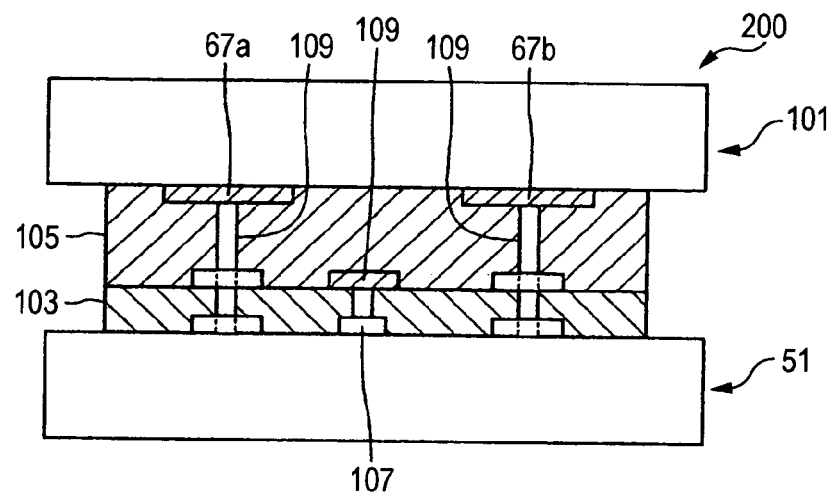
Figure 9C:
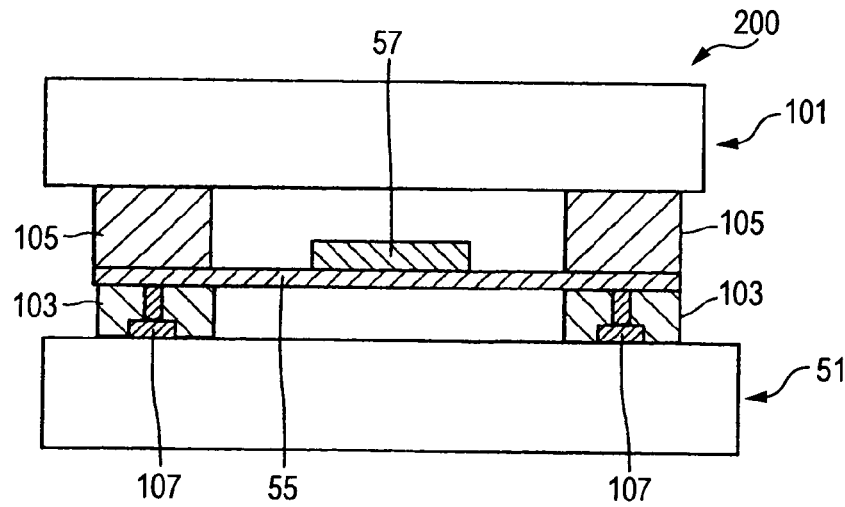

FIG. 8 is a plan view of the reflection-type light modulating element according to the second embodiment where the toughness of the beam body is enhanced, and FIGS. 9A, 9B and 9C are cross-sectional views in the sections IXA—IXA, IXB—IXB and IXC—IXC of FIG. 8, respectively. In this embodiment, the same member as the member shown in FIGS. 1 to 7 is denoted by the same reference numeral and redundant description is omitted.

The reflection-type light modulating element 200 constituting the reflection-type light modulating array element of this embodiment is enhanced in the toughness by imparting rigidity to the support structures of the hinge 55 and the upper electrode 67. Fundamentally, an upper electrode substrate (top plate) 101 is disposed to face the substrate 51 with a space, and end parts in the extending direction of the hinge 55, which work out to support parts, each is sandwichedly held by a lower spacer 103 intervening between the end part and the substrate 51 and an upper spacer 105 intervening between the end part and the top plate 101.

More specifically, the upper electrode 67 is formed on the top plate 101. The lower electrode 63 is formed on the driving circuit substrate 51 and thereon, a first insulating film (for example, an SiNx film formed by PE-CVD) which is the lower spacer 103 having a thickness controlled with good precision is formed as the support part (serving also as the spacer). At this time, contact holes 107 shown in FIGS. 9B and 9C are formed (by RIE) and an electrically conducting member (for example, a metal such as W or Cu) is filled therein so that the electrically conducting part 59 of the hinge 55 can be electrically connected on the driving circuit substrate 51 side. Furthermore, a resist as a sacrifice layer is provided in the lower part of the hinge 55/mirror part 57 and the height (thickness) of the resist is controlled to be the same as the height of the first insulating film.

Further thereon, a second insulating layer which is the upper spacer 105 is formed as the support part. At this time, contact holes 109 shown in FIG. 9B are formed (by RIE) and an electrically conducting member (for example, a metal such as W or Cu) is filled therein so that the upper electrode 67 can be electrically connected on the driving circuit substrate 51 side. Finally, the driving circuit substrate 51 and the top plate 101 are laminated such that the electrodes face each other.

According to the thus-constituted reflection-type light modulating element 200, both ends in the extending direction of the hinge 55, which come to rockably support the movable member 61, are sandwiched by a lower spacer 103 and an upper spacer 105, and the lower spacer 103 and the upper spacer 105 are sandwichedly held by the substrate 51 and the top plate 101, so that both ends of the hinge 55, which work out to support parts for the movable member 61, can be enhanced in rigidity and toughness.

Also, a plurality of the reflection-type light modulating elements 100 or reflection-type light modulating elements 200 may be one-dimensionally or two-dimensionally arrayed to constitute a reflection-type light modulating array element.

This reflection-type light modulating array element can function as one reflection-type light modulating device by one-dimensionally or two-dimensionally arraying, for example, reflection-type light modulating elements 100 (or reflection-type light modulating elements 200) having a same structure on the same array substrate 111. Accordingly, when reflection-type light modulating elements 100 are arrayed, for example, for a display device or an exposure device, many reflection-type light modulating elements 100 can be homogeneously and highly precisely disposed by a semiconductor step and the light output from respective reflection-type light modulating elements 100 corresponding to pixels can be readily uniformalized in view of intensity, phase and position, so that high resolution and high scan precision can be easily obtained.

In the reflection-type light modulating array element where a plurality of the reflection-type light modulating elements 100 are arrayed, the movable body electrodes 89 shown in FIG. 4 of respective reflection-type light modulating elements 100 are commonly connected and the reflection-type light modulating elements 100 are independently driven by a voltage applied to the first driving electrode 85 and the second driving electrode 87 of each reflection-type light modulating element 100.

According to the reflection-type light modulating array element having such a wiring structure, out of three members of first driving electrode 85, second driving electrode 87 and movable body electrode 89 of the reflection-type light modulating element 100, the movable body electrode 89 is connected by common wiring and therefore, each reflection-type light modulating element 100 can be independently driven and controlled by other two members of first driving electrode 85 and second driving electrode 87. Accordingly, in a reflection-type light modulating array element having n reflection-type light modulating elements 100, a wiring pattern can be formed to give a number of wiring lines as small as 2×n+1 instead of the original number 3×n of wiring lines.

The reflection-type light modulating element having such a constitution can be suitably applied to array formation in the unit of several tens of thousands of pixels or more and can fabricate a constitution enabling low-voltage and high-speed driving, ensuring durability, facilitating the realization of miniaturization and high resolution, and yielding high utility efficiency of light.

The reflection-type light modulating array element according to the third embodiment of the present invention is described below.

Figure 10:
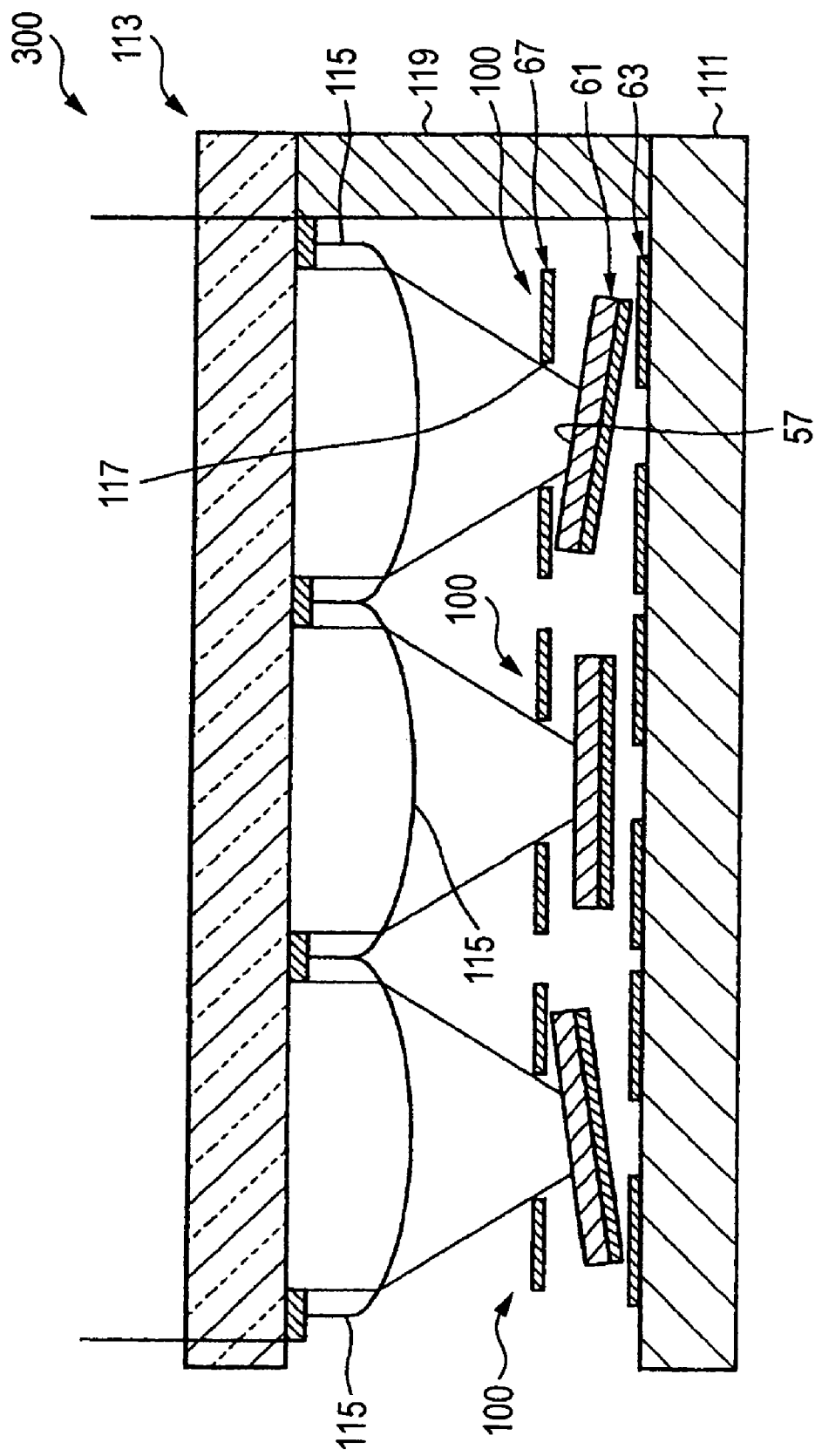
FIG. 10 is a cross-sectional view of the reflection-type light modulating array element according to the third embodiment where array formation and microlens integration are intended.

FIG. 10 is a cross-sectional view of the reflection-type light modulating array element according to the third embodiment where array formation and microlens integration are intended.

In the reflection-type light modulating array element 300 of this embodiment, a microlens array 113 is integrally provided in the free space on the injection side. The microlens array 113 is a lens array extending at least in the one-dimensional direction and having a constitution, for example, that plano-convex fine lenses (microlenses) 115 each having a nearly rectangular contour are disposed like a matrix in the one-dimensional or two-dimensional direction.

The microlens array 113 comprises a transparent body and converges light entering perpendicularly to the plate surface by refracting the light on the refraction end face of the microlens 115. The microlens array 113 is disposed to face the substrate 111 through a support wall 119 such that the light converged region can correspond to the mirror opening part 117. The microlens array 113 can be produced from a glass, a plastic or the like, for example, by a molding method, a press method or a resist transfer method using photolithographic dry etching.

In this reflection-type light modulating array element 300 having a microlens array 113, the light converged by a microlens 115 is injected into the mirror part 57 of the movable member 61. In an element having no microlens 115, when an upper electrode 67 is disposed on the light injection side of the mirror part 67, the opening area allowing for injection of light into the reflection-type light modulating element 100 becomes small and the incident light is blocked (or the intensity is reduced) by the upper electrode 67 to decrease the utility efficiency of light. On the other hand, when light converged by a microlens 115 is injected, even with a small opening part 117, the incident light can be injected into the mirror part 67 without being blocked by the upper electrode 67, whereby the utility efficiency of light is enhanced and even when the opening area is small, bright deflected light can be obtained with high efficiency.

The exposure apparatus according to the fourth embodiment of the present invention is described below.

Figure 11:
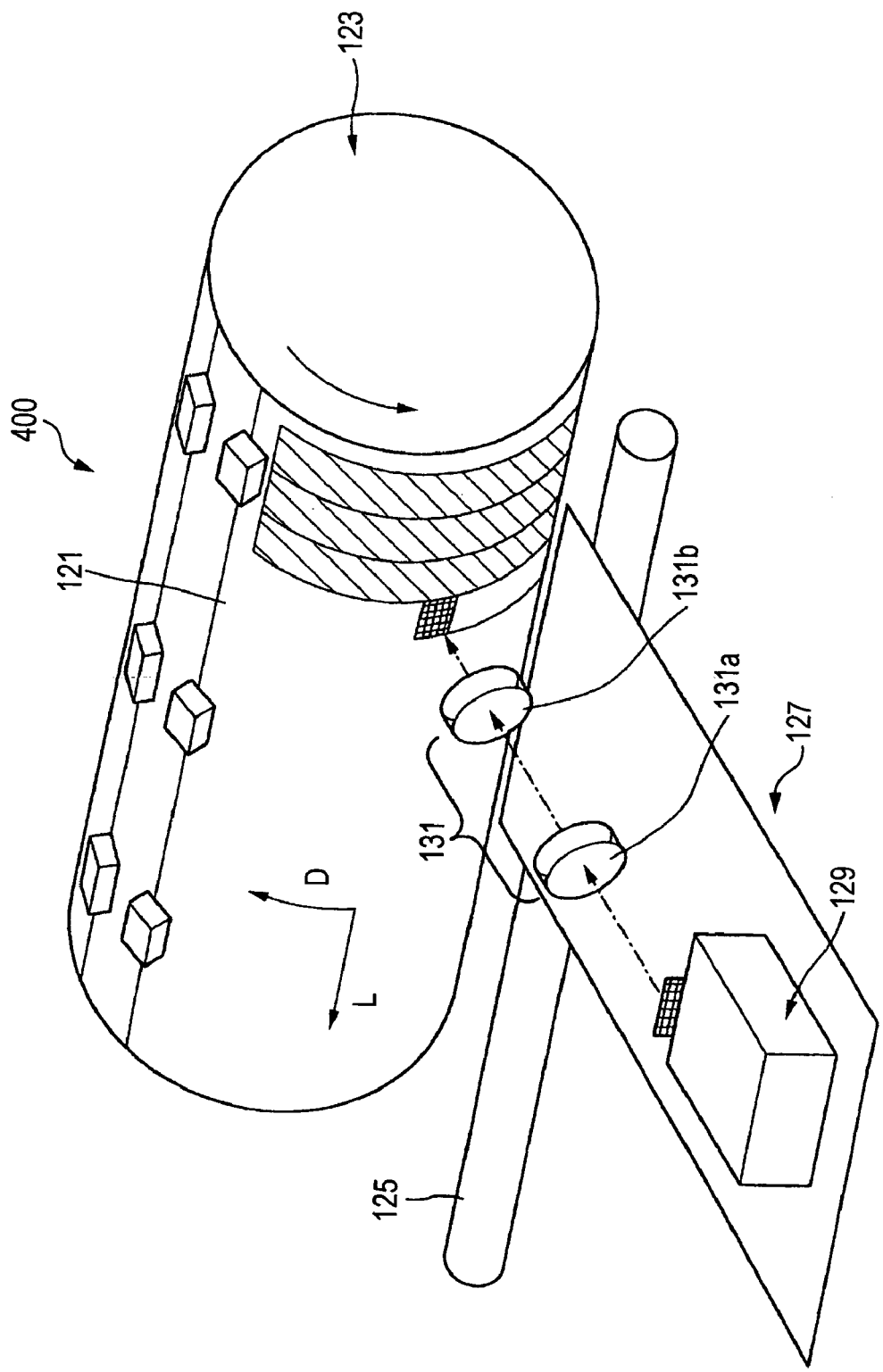
FIG. 11 is a constitutional view of the exposure apparatus according to the fourth embodiment using the reflection-type light modulating array element.
Figure 12:
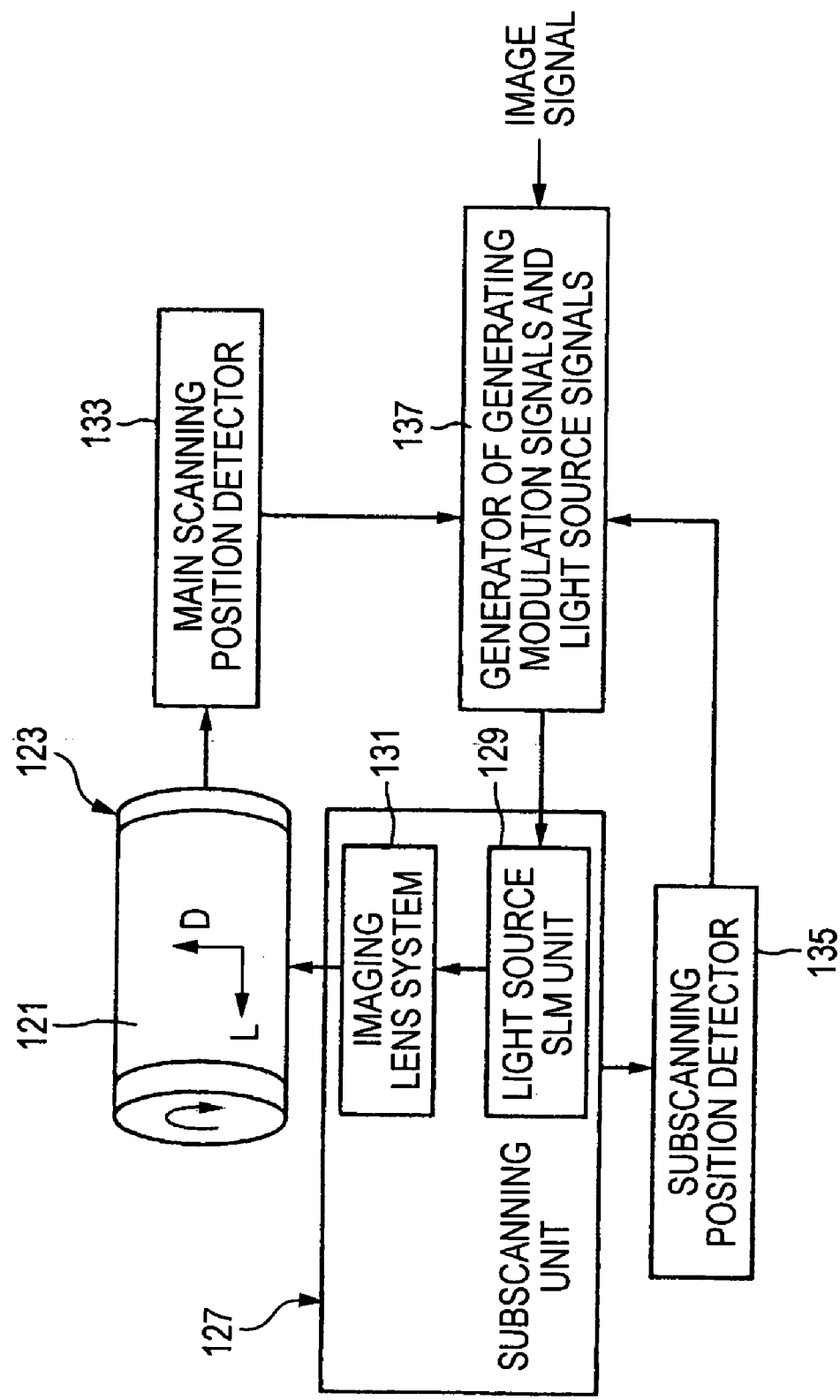
FIG. 12 is a block diagram of the exposure apparatus shown in FIG. 11.
Figure 13:
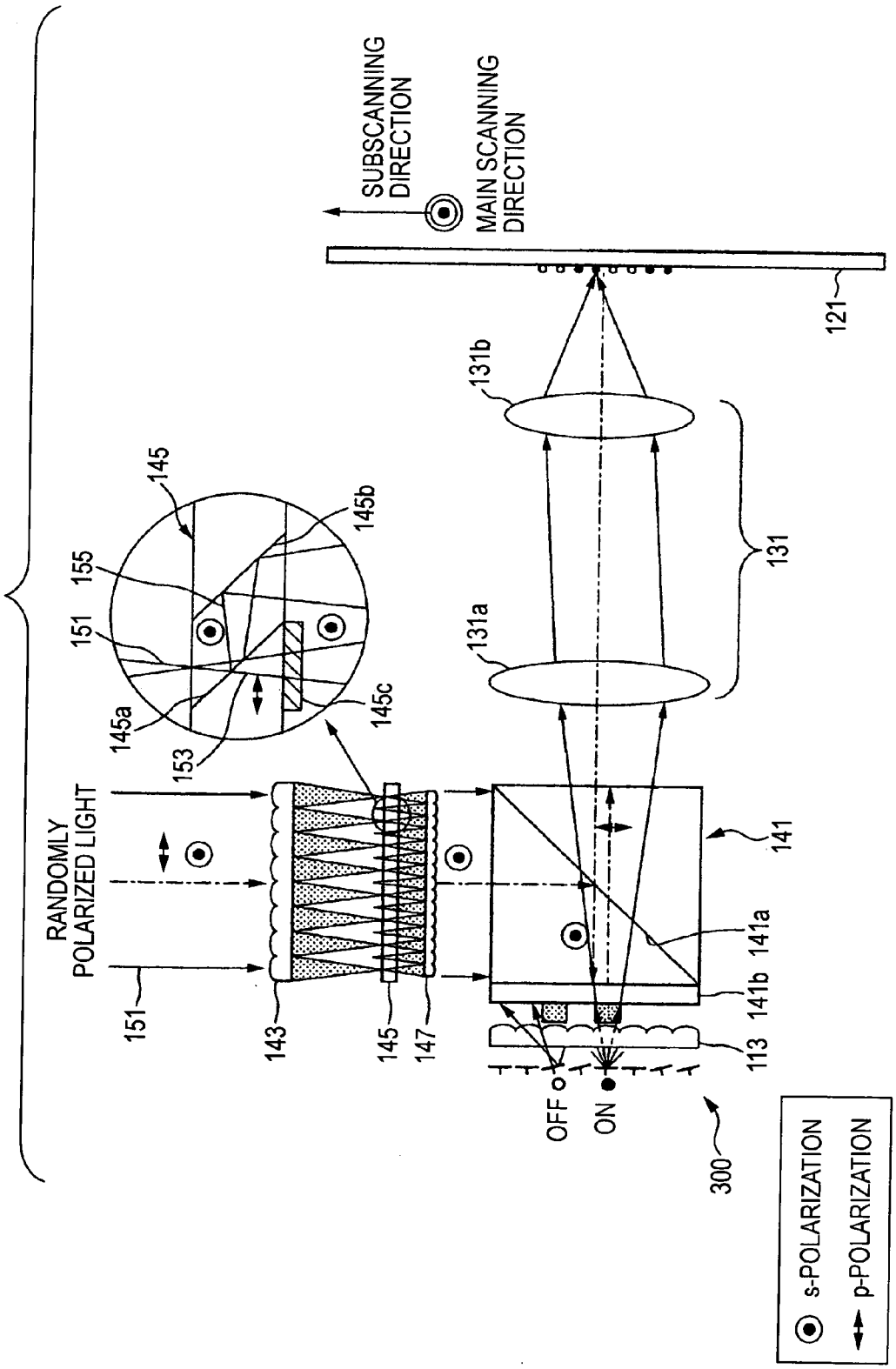
FIG. 13 is a constitutional view of the exposure head shown in FIG. 11.
Figure 14:
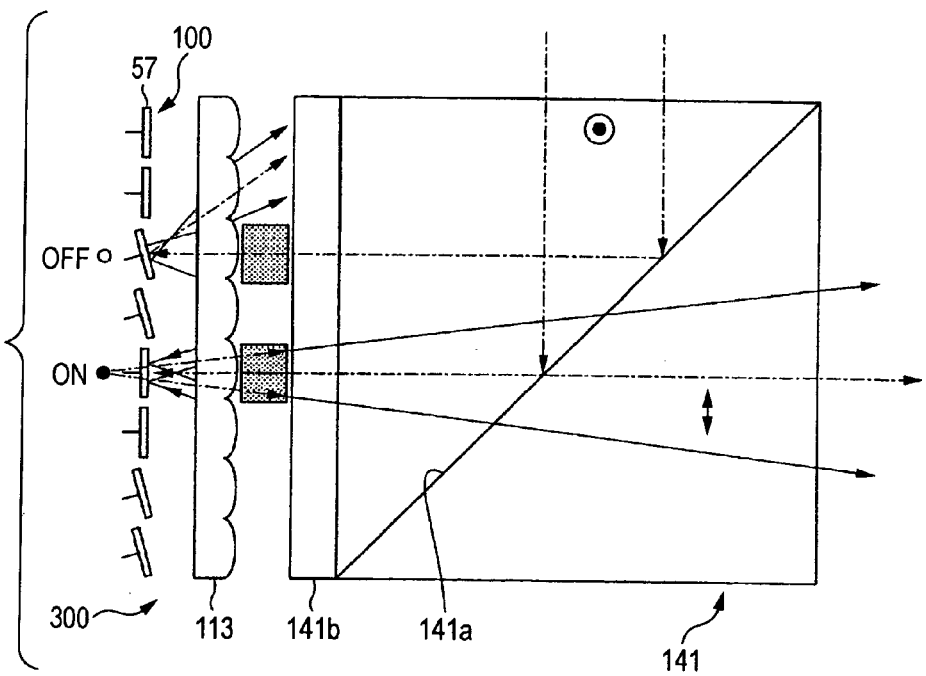
FIG. 14 is an enlarged view of the vicinity of the reflection-type light modulating array element shown in FIG. 13.

FIG. 11 is a constitutional view of the exposure apparatus according to the fourth embodiment using the reflection-type light modulating array element, FIG. 12 is a block diagram of the exposure apparatus shown in FIG. 11, FIG. 13 is a constitutional view of the exposure head shown in FIG. 11, and FIG. 14 is an enlarged view of the vicinity of the reflection-type light modulating array element shown in FIG. 13.

The above-described reflection-type light modulating array element 300 can be suitably used, for example, in an exposure apparatus 400.

As shown in FIG. 11, the exposure apparatus 400 has a basic constitution comprising a drum 123 for adsorbing and holding an exposure object 121 on its outer circumferential surface, and a subscanning unit 127 movably supported by a guide axis 125 extending along the rotation axis of the drum 123. The drum 123 is rotated in the counterclockwise direction of FIG. 11 by a rotary drive motor (not shown), and the subscanning unit 127 is moved in the right/left directions of FIG. 11 by a horizontal drive motor (not shown). Here, in the exposure object 121, the D direction by the rotation of the drum 123 is the main scanning direction and the L direction by the movement of the subscanning unit 127 is the subscanning direction.

As shown in FIG. 12, the subscanning unit 127 comprises a light source•SLM unit 129 and an imaging lens system 131. The rotation position of the drum 123 is detected by a main scanning position detector 133 and the movement position of the subscanning unit 127 is detected by a subscanning position detector 135. The position signals detected by these main scanning position detector 133 and subscanning position detector 135 are input into a signal generator 137. Based on these position signals, the signal generator 137 outputs modulation signals and light source signals to the light source•SLM unit according to image signals sent from a host control section. The imaging lens system 131 is constituted by combined zoom lenses 131a and 131b for changing the magnification of laser light modulated and ejected from the light source•SLM unit 129 and forming an image on the surface of the exposure object 121.

In the reflection-type light modulating array element 300 of the light source•SLM unit 129, a plurality of reflection-type light modulating elements 100 are arrayed in the subscanning direction. Accordingly, when the exposure object 121 and the subscanning unit 127 are relatively moved with respect to the direction (main scanning direction) orthogonal to this array direction, a one-line portion can be exposed in that direction of the exposure object 121 to give the same number of pixels as the number of reflection-type light modulating elements 100 arrayed.

Along with the movement of the exposure object 121 in the main scanning direction, image signals of a one-line portion are sent out as modulation signals and light source signals to the reflection-type light modulating array element 300 and each reflection-type light modulating element 100 is on-off controlled. By this control, the exposure light ejected from the subscanning unit 127 is ON-OFFed and the exposure object 121 is exposed in the main scanning direction in the unit of the same number of pixels as the number of the reflection-type light modulating elements 100, whereby scan exposure of a one-line portion is performed. Thereafter, the subscanning unit 127 is moved in the subscanning direction and the next one-line portion is sequentially exposed.

As shown in FIG. 13, the light source•SLM unit 129 comprises a polarizing beam splitter 141 which is a polarizing element of polarizing and combining the light from the light source and the light from the reflection-type light modulating array element 300. In the light path starting from the light source and reaching the polarizing beam splitter 141, a first lens array plate 143, a polarization conversion element 145 of converting the light from the light source all into p-polarization, and a second lens array plate 147 of giving a parallel light flux from the light converted into polarized light by the polarization conversion element 145 are disposed in this order from the light source side. The reflection-type light modulating array element 300 having the microlens array 113 is disposed to oppose the adjacent surface orthogonal to the surface of the polarizing beam splitter 141 where the light from the light source is injected.

That is, in the light source•SLM unit 129, the light from the light source is injected into the reflection-type light modulating array element 300 through the polarizing beam splitter 141 and the microlens array 113, and the reflected light reflected by the reflection-type light modulating array element 300 is again injected into the polarizing beam splitter 141 through the microlens array 113 and at the same time, transmitted through the polarizing beam splitter 141 and irradiated on the exposure object 121. Also, the light injected from the light source is converted into a light flux of only p-polarization or only s-polarization by the polarization conversion element 145 and ejected to the polarizing beam splitter 141.

More specifically, the first lens array plate 143 is a lens array extending at least in the one-dimensional direction and, as shown in FIG. 13, produces a linear or dotted array in the vicinity of the focus surface on its back side from the non-polarized light (random polarization) ejected from the light source. The first lens array plate 143 has a constitution, for example, that plano-convex fine lenses each having a nearly rectangular contour are disposed like a matrix in the one-dimensional or two-dimensional direction.

The polarization conversion element 145 disposed in the light path for light from the light source has a pitch almost equal to the pitch of the linear or dotted array produced in the vicinity of the focus surface on the back side of the first lens array plate 143. This polarization conversion element is disposed in the vicinity of the focus surface and converts the light ejected from the light source all into p-polarization. The constitution thereof is shown in the rounded envelope of FIG. 13 by enlarging a part of the polarization conversion element 145. The polarization conversion element 145 comprises a polarization splitting surface 145a formed by coating a dielectric multilayer film of splitting p-polarization and s-polarization, and also comprises a total reflection surface 145b and a half-wavelength plate 145c. The symbols of two-headed arrow and open circle with a dot in the center each shows the direction of polarization of each light. That is, the two-headed arrow symbol shows the polarization (p-polarized light) in the right/left directions of the Figure and the symbol of open circle with a dot in the center shows the polarization in the directions perpendicular to the paper having the Figure. In the Figure, the filled circle and the open circle drawn on the left side of the mirror part 57 each shows a virtual point light source.

The light flux 151 transmitted through the first lens array plate 143 and injected into the polarization conversion element 145 is split on the polarization splitting surface 145a into two light fluxes of linear polarization component, which are orthogonal to each other. That is, out of the light flux 151, the p-polarization 153 passes through the polarization splitting surface 145a and the s-polarization 155 is reflected on the polarization splitting surface 145a. The p-polarization 153 transmitted through the polarization splitting surface 145a passes through the half-wavelength plate 145c and thereby is converted into s-polarization and ejected from the polarization conversion element 145. On the other hand, the s-polarization 155 reflected on the polarization splitting surface 145a is reflected on the reflection surface 145b and then as-is ejected from the polarization conversion element 145. Accordingly, the light flux 151 injected into the polarization conversion element 145 all is converted into s-polarization and then ejected.

The second lens array plate 147 disposed in the light path for light from the light source has an about ½ pitch of the pitch of the polarization conversion element 145 and is disposed so that the focus surface on its front side can almost agree with the focus surface on the back side of the first lens array plate 143. By virtue of this arrangement, the light flux ejected from the second lens array plate 147 becomes nearly parallel light and this parallel light flux is injected into the polarizing beam splitter 141.

The polarizing beam splitter 141 is a polarizing element of performing light merging with reduced loss in the quantity of light and combines the light ejected from the light source and converted into s-polarized light by the polarization conversion element 145 and the light once ejected from the polarizing beam splitter 141 and reflected by the reflection-type light modulating array element 300. The polarizing beam splitter 141 comprises a polarization splitting surface 141a having optical properties of reflecting the s-polarized light from the light source and transmitting the light from the reflection-type light modulating array element 300. Accordingly, as shown in FIG. 14, the s-polarized light injected from the light source side into the polarizing beam splitter 141 which is an illumination optical system is reflected on the polarization splitting surface 141a and ejected toward the reflection-type light modulating array element 300, and the incident light reflected by the reflection-type light modulating array element 300 is transmitted and emitted through the polarizing beam splitter 141 which is a projection optical system.

On the surface of the polarizing beam splitter 141 facing the reflection-type light modulating array element 300, a ¼-wavelength plate 141b is provided. Accordingly, the s-polarized light reflected on the polarization splitting surface 141a is transmitted through the ¼-wavelength plate 141b, then reflected by the reflection-type light modulating array element 300, and again transmitted through the ¼-wavelength plate 141b, whereby the angle of polarization is converted by 90° and the light becomes p-polarized light and emerges from the polarizing beam splitter 141.

The p-polarized light resulting from such light modulation is irradiated on an exposure object 121 by an imaging lens system 131. Accordingly, when the exposure object 121 is exposed to the reflected light through the imaging lens system 131 and an image is recorded, exposure or image recording can be achieved. Incidentally, the exposure object 121 may be a screen in addition to a recording medium held on the drum 123. In this case, when the reflection-type light modulating array element 300 is driven and controlled in accordance with image signals and the light reflected by the reflection-type light modulating array element 300 is projected on the screen through a projection lens, a projector using the light modulating array element of the present invention is obtained.

According to this exposure apparatus 400, the light ejected from the light source into the polarizing beam splitter 141 is converted by the polarization conversion element 145 into a light flux of only p-polarization or only s-polarization and transmitted through the polarizing beam splitter 141 without generating any return light component. That is, the polarization of reflected light is uniformalized by the polarization conversion element 145 and this can prevent the generation of return light components proceeding toward the light source side from the mirror surface (polarization splitting surface 141a) of the polarizing beam splitter 141, which is generated when the reflected light is non-polarized light. Therefore, in the exposure apparatus 400 comprising a compensation circuit (not shown) for detecting a part of the light ejected from the light source (laser diode) in a photodiode through the polarizing beam splitter 141, the compensation circuit does not detect the return light. As a result, the laser diode can be prevented from abnormal output control due to the compensation circuit, which is generated when the photodiode receives the return light as an extra quantity of light.

Various modification examples of the exposure apparatus 400 according to the fourth embodiment are described below. In each modification example below, the same member as the member shown in FIGS. 1 to 14 is denoted by the same reference numeral and redundant description is omitted.

MODIFICATION EXAMPLE 1

Figure 15:
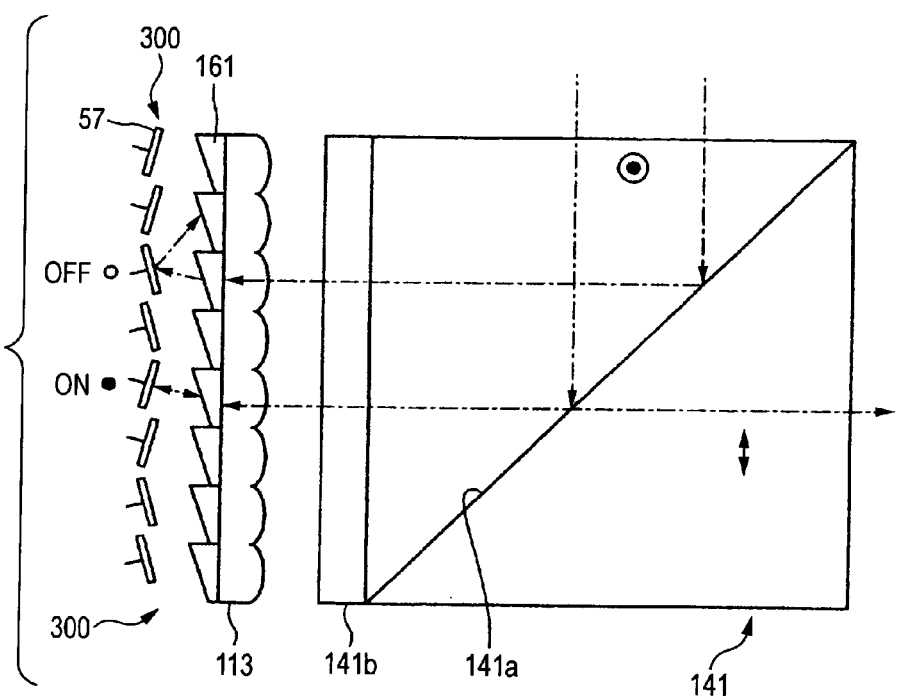
FIG. 15 is an enlarged view of the main part of Modification Example 1 where prisms are provided on the microlens array of FIG. 14.

FIG. 15 is an enlarged view of the main part of Modification Example 1 where prisms are provided on the microlens array of FIG. 14.

In this Modification Example, prisms 161 are arrayed to correspond to respective microlenses 115 in the microlens array 113 of the reflection-type light modulating array element 300 in which the light source•SLM unit 129 is provided. The prism 161 ejects the light transmitted through the microlens 115, to the mirror part 57 at a predetermined angle of refraction. The light injected into the mirror part 57 at this angle of refraction is, when the mirror part 67 is at the OFF tilt position, reflected toward the direction different from the injection direction and when the mirror part 57 is at the ON tilt position, reflected to the same direction as the injection direction.

According to this Modification Example, a prism 161 is provided, so that in the state where the mirror part 57 and the microlens 115 are opposedly disposed, the incident light can be reflected even when the mirror part 67 is not kept at a horizontal position, and the reflected light can be taken out at the stable both-end tilt position of OFF tilt position or ON tilt position of the mirror part 57.

MODIFICATION EXAMPLE 2

Figure 16:
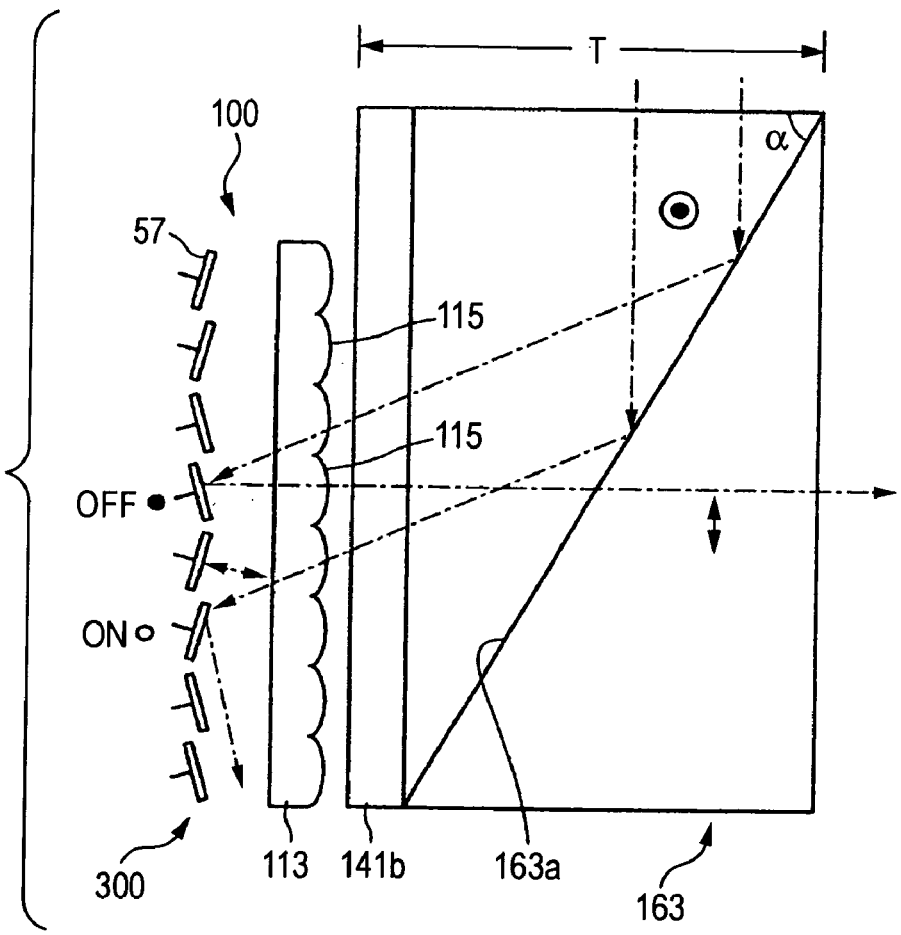
FIG. 16 is an enlarged view of the main point of Modification Example 2 where the incident light to the microlens array is tilted.

FIG. 16 is an enlarged view of the main point of Modification Example 2 where the incident light to the microlens array is tilted.

In this Modification Example, the polarizing beam splitter 163 has a polarization splitting surface 163a of reflecting the incident light from the light source at an angle except for right angle. The angle α of the polarization splitting surface 163a is freely set according to the positions of microlenses 115 and reflection-type light modulating elements 100.

According to this Modification Example, when the angle α of the polarization splitting surface 163a is set to 45° or more, the reflection angle on the polarization splitting surface 163a becomes an obtuse angle and the thickness T of the polarizing beam splitter 163 can be decreased. Also, when the angle α of the polarization splitting surface 163a is set to form an incident light path and a reflected light path on adjacent two microlenses 115 and 115, similarly to Modification Example 1, the reflected light can be taken out at the stable both-end tilt position of OFF tilt position or ON tilt position of the mirror part 57.

MODIFICATION EXAMPLE 3

Figure 17:
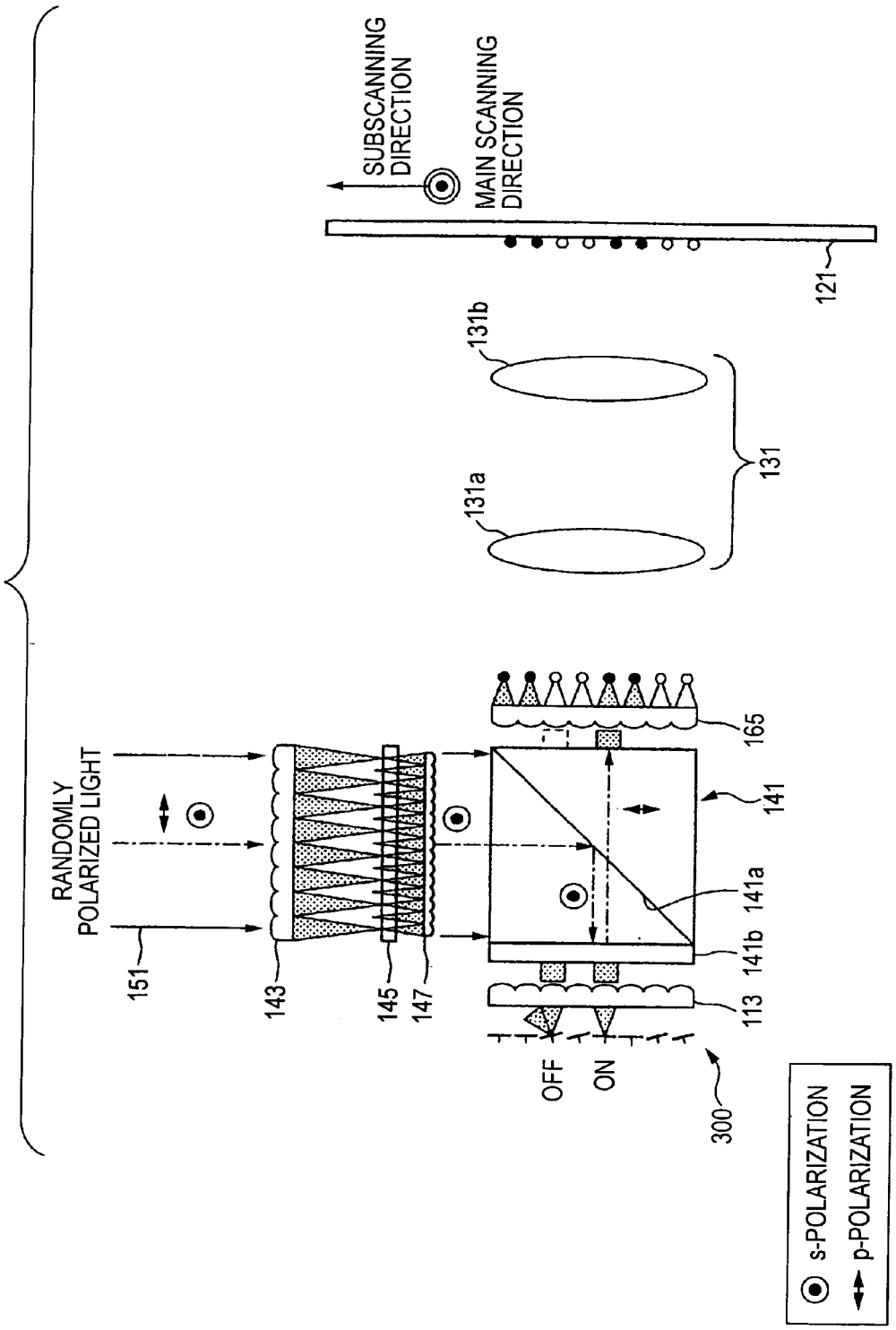
FIG. 17 is a constitutional view of Modification Example 3 where a microlens array is provided on the light ejection side of the beam splitter.

FIG. 17 is a constitutional view of Modification Example 3 where a microlens array is provided on the light ejection side of the beam splitter.

In this Modification Example, a third lens array plate 165 is provided on the surface of the polarizing beam splitter 141 on the exposure light ejection side. The third lens array plate 165 converges each light flux reflected from the mirror part 57 and transmitted through the polarizing beam splitter 141.

According to this Modification Example, the exposure object 121 can be exposed directly by the modulated light and therefore, an optical system close to contact exposure can be constituted.

MODIFICATION EXAMPLE 4

Figure 18:
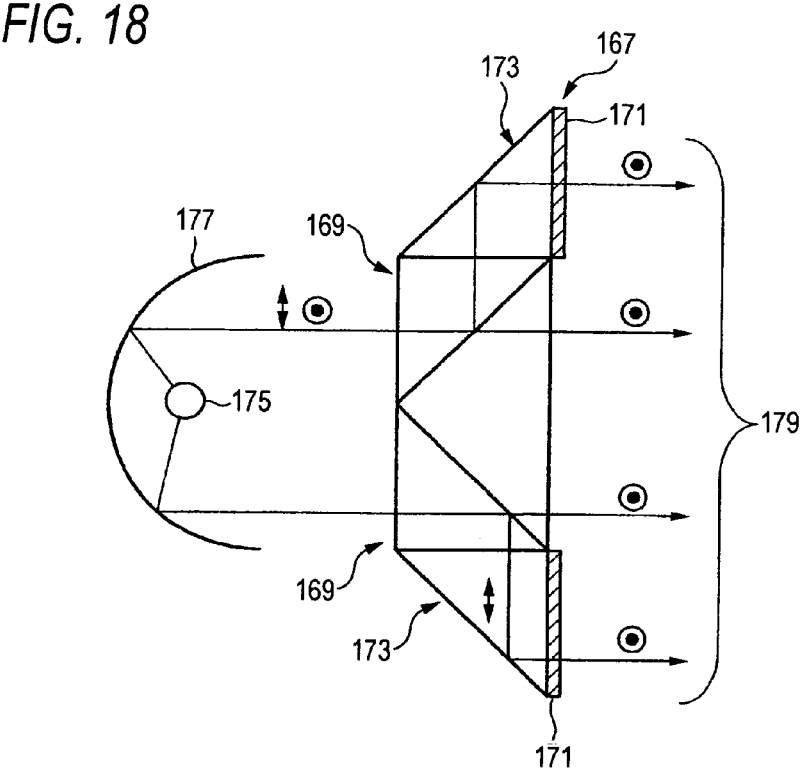
FIG. 18 is a constitutional view of Modification Example 4 where the polarization conversion element comprises a pair of beam splitters and a pair of half-wavelength plates.

FIG. 18 is a constitutional view of Modification Example 4 where the polarization conversion element comprises a pair of beam splitters and a pair of half-wavelength plates.

In this Modification Example, the polarization conversion element 167 is constituted by a pair of polarizing beam splitters 169 and 169 and a pair of prisms 173 and 173 each equipped with a half-wavelength plate 171. When randomly polarized light from a light source 175 enters the light beam splitters 169 and 169 as a nearly parallel beam flux converted by a reflector (concave mirror) 177, the polarizing beam splitters 169 and 169 each transmits s-polarized light, whereas p-polarized light is caused to displace its light path in parallel and at the same time, converted into s-polarized light due to phase shift by the half-wavelength plate 171, as a result, outgoing light 179 entirely uniform in the plane of polarization is obtained.

MODIFICATION EXAMPLE 5

Figure 19:
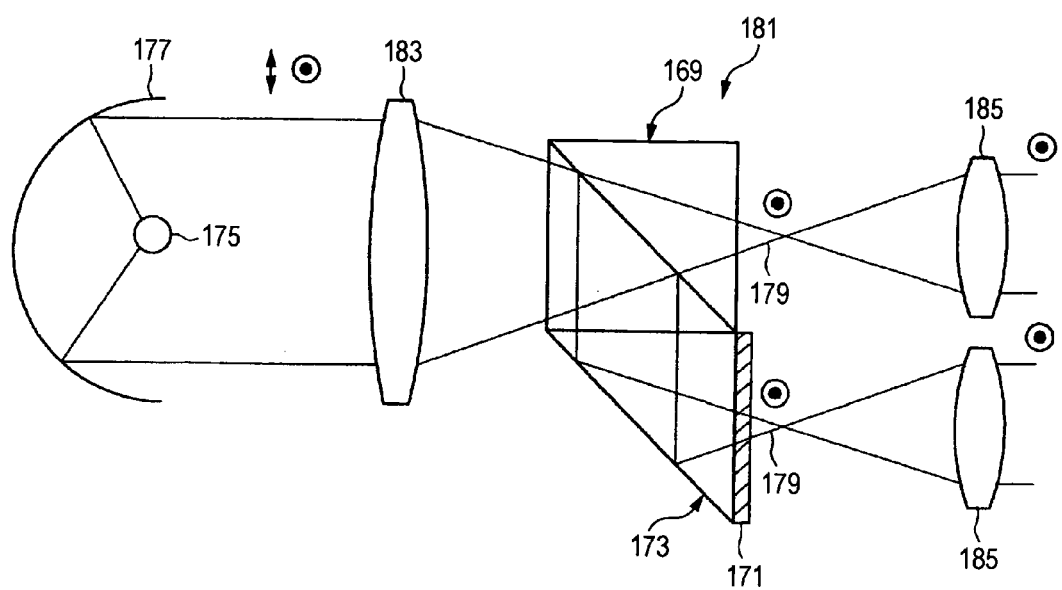
FIG. 19 is a constitutional view of Modification Example 5 where the polarization conversion element comprises one beam splitter and one half-wavelength plate.

FIG. 19 is a constitutional view of Modification Example 5 where the polarization conversion element comprises one beam splitter and one half-wavelength plate.

In this Modification Example, the polarization conversion element 181 is constituted by a polarizing beam splitter 169 and a prism 173 equipped with a half-wavelength plate 171, a convex lens 183 is provided between the light source 173/reflector 177 and the polarizing beam splitter 196, and convex lenses 185 and 185 are provided on respective light ejection sides of polarizing beam splitter 169 and half-wavelength plate 171.

The randomly polarized light from the light source 175 is converted into a nearly parallel light flux by the reflector 177, converged by the convex lens 183 and injected into the polarizing beam splitter 169. Out of the injected random polarization, the polarizing beam splitter 169 transmits s-polarized light, whereas p-polarized light is caused to displace its light path in parallel and at the same time, converted into s-polarized light due to phase shift by the half-wavelength plate 171. As a result, outgoing light 179 uniform in the plane of polarization is emitted from the polarizing beam splitter 196 and the half-wavelength plate 171. This outgoing light 179 is converged, then diffused, again injected into the convex lens 185 and thereby converted into parallel light.

According to this Modification Example, the converged light can be transmitted to the polarization conversion element 181 and therefore, the polarization conversion element 181 can be miniaturized.

MODIFICATION EXAMPLE 6

Figure 20:
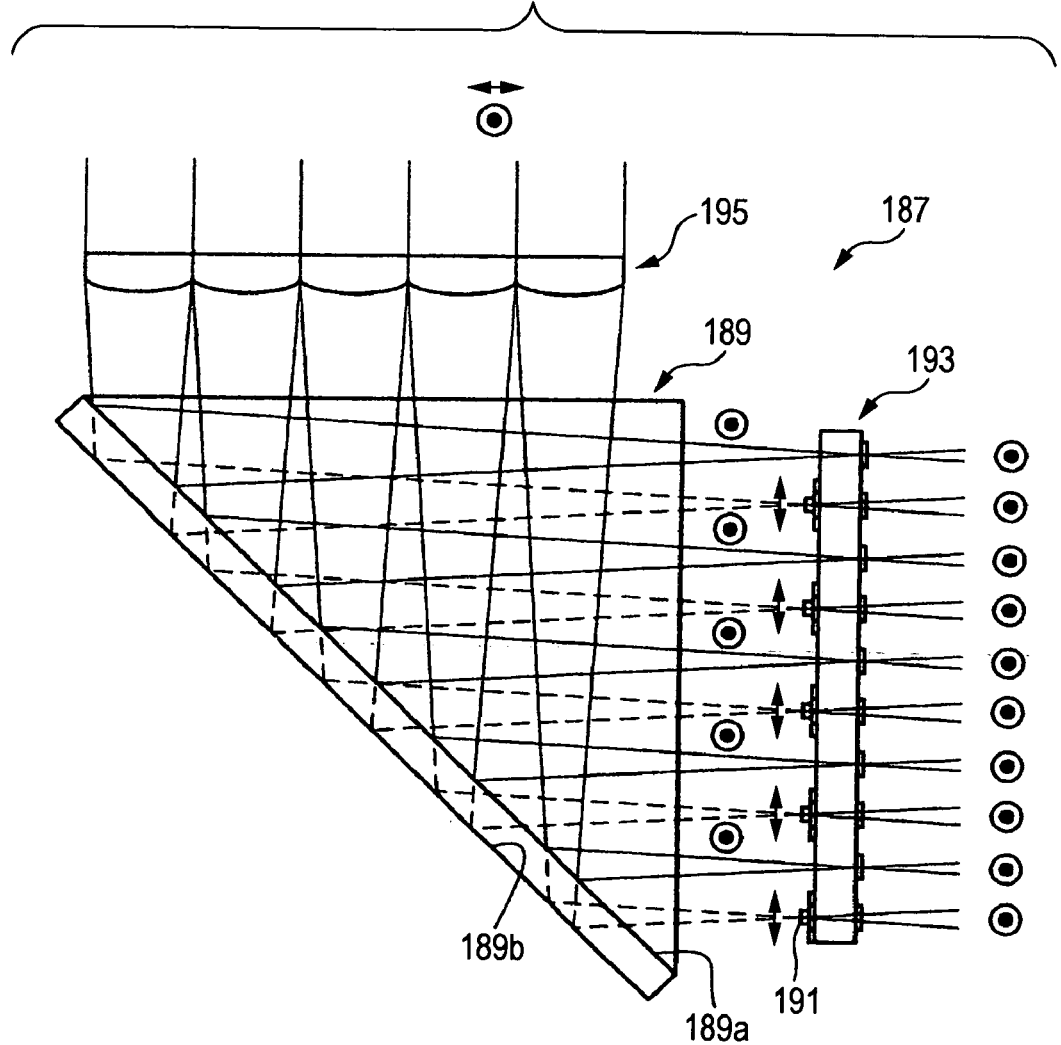
FIG. 20 is a constitutional view of Modification Example 6 where the polarization conversion element uses a polarization conversion prism.

FIG. 20 is a constitutional view of Modification Example 6 where the polarization conversion element uses a polarization conversion prism.

In this Modification Example, the polarization conversion element 187 comprises a polarization conversion prism 189 and multiple phase plates 193 each equipped with a half-wavelength plate 191. Also, a lens array 195 is provided between the light source (not shown) and the polarization conversion prism 189. The polarization conversion prism 189 has two parallel polarization splitting surfaces 189a and 189b. Out of the random polarization injected into the polarization conversion prism 189, s-polarized light is reflected and ejected from the polarization splitting surface 189a, whereas p-polarized light is reflected and ejected from the polarization splitting surface 189b. The polarization splitting surfaces 189a and 189b each is tilted to the injection direction at a predetermined angle and therefore, these light components are alternately split and ejected from the polarization conversion prism 189.

The half-wavelength plate 191 is provided on the surface of the phase plate 193 opposing the polarization conversion prism at a pitch double the split pitch, that is, disposed to correspond, for example, only to p-polarized light.

According to this Modification Example, when random polarization is injected into the polarization conversion prism 189, the incident light is split into two linear polarizations differing in the polarization direction by the polarization splitting surfaces 189a and 189b, and p-polarized light as one polarization is uniformalized by the half-wavelength plate 191 to the polarization direction of another polarization, whereby the illumination light of natural light is converted into specific linear polarization (in the Figure, into s-polarized light).

MODIFICATION EXAMPLE 7

Figure 21:
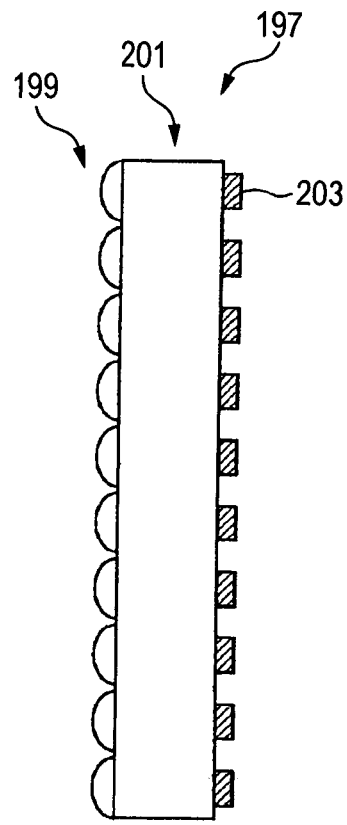
FIG. 21 is a constitutional view of Modification Example 7 where the polarization conversion element comprises a birefringent crystal.
Figure 22:
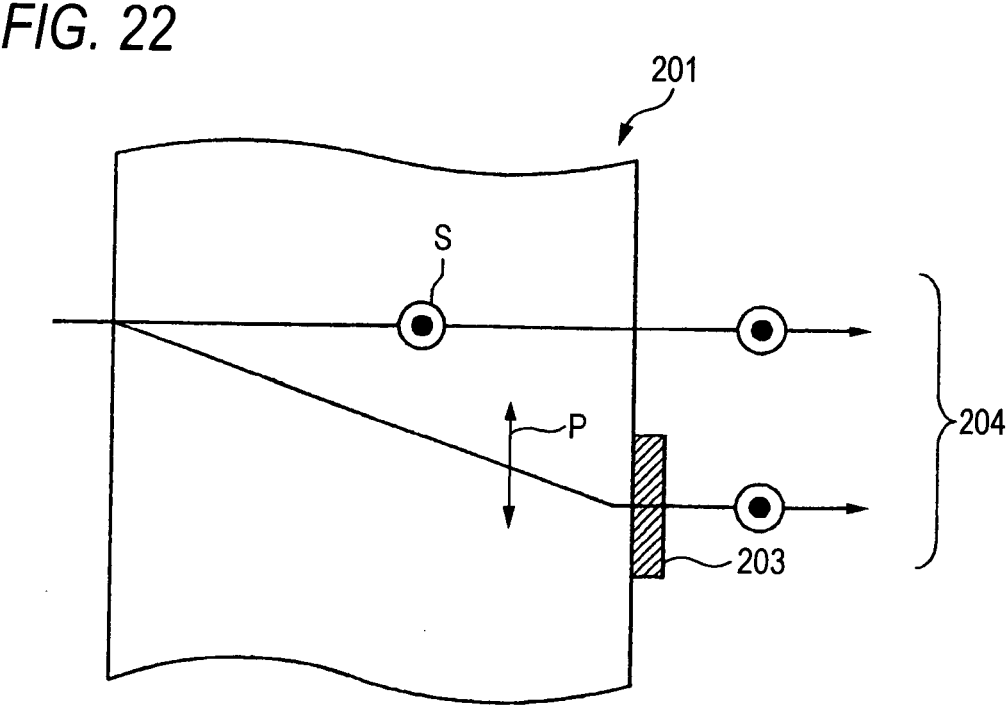
FIG. 22 is an explanatory view showing the production of linear polarization by the polarization conversion element shown in FIG. 21.

FIG. 21 is a constitutional view of Modification Example 7 where the polarization conversion element comprises a birefringent crystal, and FIG. 22 is an explanatory view showing the production of linear polarization by the polarization conversion element shown in FIG. 21.

In this Modification Example, the polarization conversion element 197 comprises a lens array 199 having condenser lenses arrayed at a constant cycle, a birefringent crystal 201 disposed to cause splitting into ordinary light (for example, s-polarized light) and extraordinary light (for example, p-polarized light) in the cycle direction of the lens array 199, and half-wavelength plates 203 being arrayed in the same cycle as the lens array 199 and uniformalizing the polarization directions of s-polarized light and p-polarized light split by the birefringent crystal 201.

The birefringent crystal 201 used here is calcite or the like. The calcite or the like causes splitting of light propagating in its inside, into s-polarized light and p-polarized light. These s-polarized light and p-polarized light both are light of linear polarization, and their polarization directions are orthogonal to each other. The polarization direction of one (p-polarized light) of the light beams split by the birefringent crystal 201 is, as shown in FIG. 22, caused to rotate 90 degrees by the half-wavelength plate 203, whereby polarization directions of two light beams can be uniformalized. In this way, light 204 of linear polarization can be produced from random polarization by using the birefringent crystal 201 and the half-wavelength plate 203.

Incidentally, as shown in FIG. 22, when the light injected into the birefringent crystal 201 is linear, this can be easily converted into light of linear polarization, but when the light is injected in a flux state, s-polarized light and p-polarized light are overlapping one another even after passing through the birefringent crystal 201 and therefore, it is impossible to selectively inject only one light into the half-wavelength plate 203.

Therefore, the polarization conversion element 197 is constituted such that a lens array 199 is disposed on the injection surface of the birefringent crystal 201. When a lens array 199 is disposed on the injection surface of the birefringent crystal 201, s-polarized light and p-polarized light can be focused on different positions, whereby only one light out of s-polarized light and p-polarized light can be selectively injected into the half-wavelength plate 203 and the injected light flux of random polarization can be converted into light of linear polarization.

The condenser lenses of the lens array 199 are arrayed at a constant cycle and the length of one cycle is preferably about 2 times the split width of s-polarized light and p-polarized light after passing through the birefringent crystal 201. Furthermore, the focal length of the lens array 199 is preferably large to such an extent that the light transmitted through the birefringent crystal 201 and converged can focus in the vicinity of the half-wavelength plate 203 disposed.

By satisfying these conditions, the positions of s-polarized light and p-polarized light after passing through the birefringent crystal 201 can be most distinctly separated. That is, selective injection of only one light out of s-polarized light and p-polarized light into the half-wavelength plate 203 is facilitated and thereby the efficiency of conversion from light of random polarization into light 204 of linear polarization can be elevated.

MODIFICATION EXAMPLE 8

Figure 23:
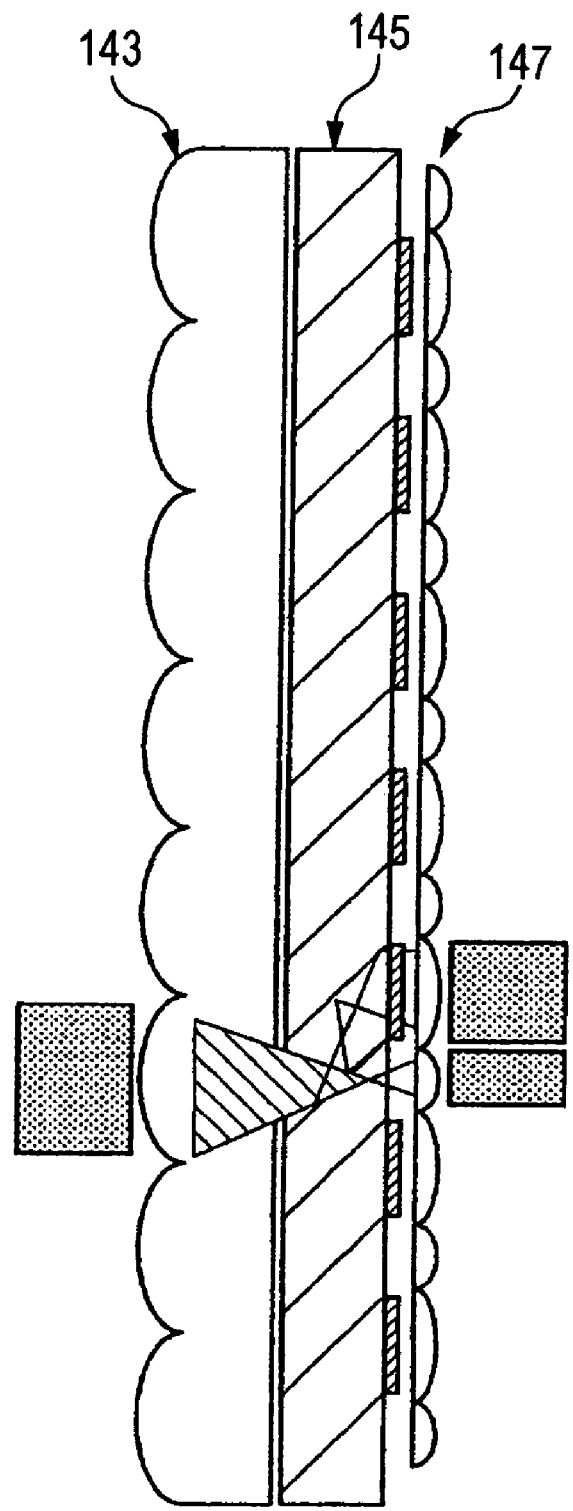
FIG. 23 is a constitutional view of Modification Example 8 where the polarization conversion element comprises integrally provided first microlens array and second microlens array.

FIG. 23 is a constitutional view of Modification Example 8 where the polarization conversion element comprises integrally provided first microlens array and second microlens array.

In this Modification Example, the optical system where light from the light source is converted into polarized light and injected into the polarizing beam splitter 141 (this may also be polarizing beam splitter 163 or 169) is constituted by integrally combining a first lens array plate 143, a polarization conversion element 145 and a second lens array plate 147, for example, by means of adhesion.

The optical system is thus constituted because the light merging efficiency varies due to change in the angle of the light flux injected into the lens array plate or change ascribable to temperature, aging or the like, such as change in the relative positions of the first and second lens array plates 143 and 147 and the polarization conversion element 145. For example, when the first lens array plate 143 comes out of phase with the polarization conversion element 145, p-polarized light becomes s-polarized light and the initially intended light merging may not be attained. Also, when the first lens array plate 143 comes out of phase with the second lens array plate 147, the ejection direction of the ejected light flux from the second lens array plate 143 deviates and the light merging may not be successfully attained. Therefore, in this Modification Example, the polarization conversion element 145 and the like are integrally combined so that change in the light merging efficiency can be prevented and illumination light stable in view of light quantity or light quantity distribution can be obtained.

MODIFICATION EXAMPLE 9

Figure 24:
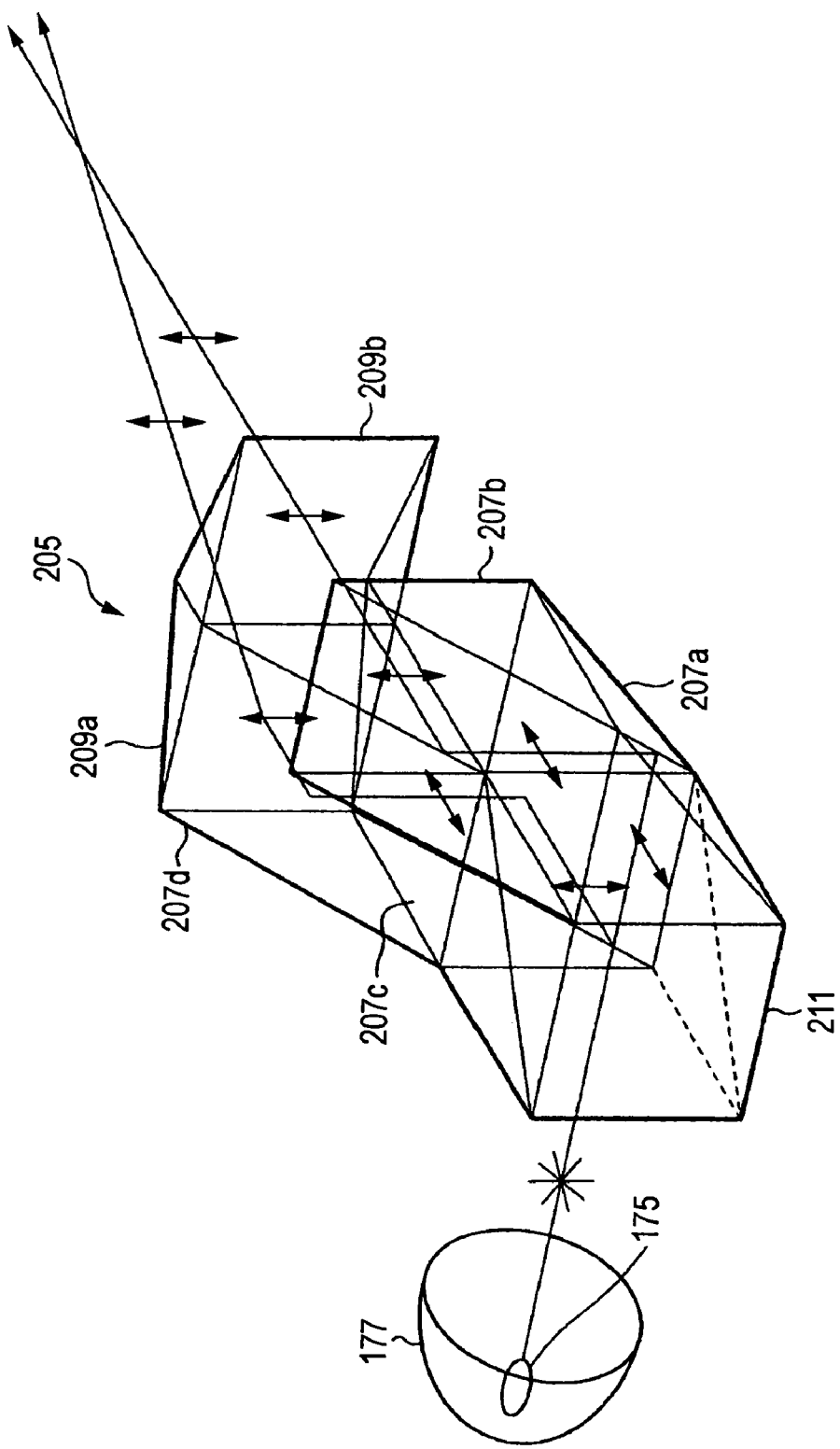
FIG. 24 is a constitutional view of Modification Example 9 where the polarization conversion element comprises four rectangular prisms and two synthesizing prisms.

FIG. 24 is a constitutional view of Modification Example 9 where the polarization conversion element comprises four rectangular prisms and two synthesizing prisms.

In this Modification Example, the polarization conversion elements comprises four rectangular prisms 207a, 207b, 207c and 207d and two synthesizing prisms 209a and 209b. On the reflection surface, a rectangular prism is used in place of a mirror.

Natural light from the light source 175 is converted into parallel light by the reflector 177 and split by the polarizing beam splitter 211 into two linearly polarized light beams (s-polarized light and p-polarized light) with their polarization directions being orthogonal to each other. The p-polarized light transmitted through the polarizing beam splitter 211 encounters total reflection twice on the inclined planes of the rectangular prisms and in this process, its polarization direction rotates 90°. On the other hand, the s-polarized light reflected on the polarization splitting surface of the polarizing beam splitter 211 enters the rectangular prisms 207c and 207d in sequence and although total reflection occurs twice on the inclined planes of the rectangular prisms, its polarization direction does not change because the reflection surfaces are disposed in parallel to each other. As a result, two linearly polarized light beams split by the polarizing beam splitter 211 both come to have the same polarization direction and travel in the same direction. Finally, two linearly polarized light beams are synthesized by using the synthesizing prisms 209a and 209b to overlap on the reflection-type light modulating array element 300.

What is clamed is:

1. A reflection-type light modulating array element comprising:
    a substrate;
    a movable member comprising a beam body provided on said substrate through a first gap, a light reflector capable of rotational displacement by twisting of said beam body, and an electrically conducting part formed at least in a partial portion of said movable member;
    a lower electrode provided on a substrate side to face said movable member through said first gap, and
    an upper electrode provided on a side opposite to said lower electrode to face said movable member through a second gap, and thereby said movable member is between said lower electrode and said upper electrode,
wherein a voltage is applied to said upper electrode, said lower electrode and said electrically conducting part to cause an rocking displacement of said light reflector and thereby deflect a reflection direction of a light.

2. The reflection-type light modulating array element according to claim 1, wherein said lower electrode and said upper electrode each is provided on both sides of said beam body.

3. The reflection-type light modulating array element according to claim 1, wherein
    said lower electrode comprises a first lower electrode and a second lower electrode provided on both sides of said beam body,
    said upper electrode comprises a first upper electrode and a second upper electrode provided on both sides of said beam body,
    said first lower electrode and said first upper electrode are provided to face each other through said movable member in a vertical direction of said substrate, said second lower electrode and said second upper electrode are provided to face each other through said movable member in a vertical direction of said substrate, and said first lower electrode and said second upper electrode, and said second lower electrode and said first upper electrode each are electrically connected.

4. The reflection-type light modulating array element according to claim 3, wherein a plurality of said reflection-type light modulating elements are arrayed in one of one-dimensional state and two-dimensional state, said first lower electrode and said second upper electrode function as a first driving electrode, said second lower electrode and said first upper electrode function as a second driving electrode, said electrically conducting part of said movable member functions as a movable body electrode, said movable body electrodes of said plurality of said reflection-type light modulating elements are commonly connected, and said reflection-type light modulating elements each is independently driven by applying a voltage to said first driving electrode and said second driving electrode of each reflection-type light modulating element.

5. The reflection-type light modulating array element according to claim 1, wherein a top plate is disposed to face said substrate with a space and provided with said upper electrode on a bottom surface thereof, end parts in the extending direction of said beam body, which function as support parts, each is sandwichedly held by a lower spacer standing between said end part and said substrate and an upper spacer standing between said end part and said top plate.

6. The reflection-type light modulating array element according to claim 1, wherein the reflection-type light modulating array element further comprises a microlens array having a plurality of microlenses therein, and said microlenses are disposed to face respective light reflectors of said reflection-type light modulating elements which are arrayed in one of a one-dimensional state and a two-dimensional state.

7. An exposure apparatus comprising the reflection-type light modulating array element according to claim 6, wherein a light from a light source is injected into said reflection-type light modulating array element through an illumination optical system and a microlens array, the reflected light reflected by said reflection-type light modulating array element is injected into a projection optical system through said microlens array, transmitted through said projection optical system, and then irradiated on an exposure object.

* * * * *